(12) United States Patent
Murdoch

(10) Patent No.: US 7,546,092 B1
(45) Date of Patent: Jun. 9, 2009

(54) TRANSCEIVER

(75) Inventor: Graham Murdoch, Cremorne (AU)

(73) Assignee: Magellan Technology Pty Limited, New South Wales (AU)

( * ) Notice: Subject to any disclaimer, the term of this patent is extended or adjusted under 35 U.S.C. 154(b) by 0 days.

(21) Appl. No.: 09/601,122

(22) PCT Filed: Jan. 29, 1999

(86) PCT No.: PCT/AU99/00059

§ 371 (c)(1), (2), (4) Date: Feb. 23, 2001

(87) PCT Pub. No.: WO99/39450

PCT Pub. Date: Aug. 5, 1999

(30) Foreign Application Priority Data

Jan. 29, 1998 (AU) .................. PP1545
Feb. 9, 1998 (AU) .................. PP1730

(51) Int. Cl.
H04B 1/46 (2006.01)
H04B 1/40 (2006.01)
H04Q 11/12 (2006.01)
H04B 1/04 (2006.01)

(52) U.S. Cl. ............... 455/82; 455/84; 455/121

(58) Field of Classification Search ......... 455/73, 455/82, 84, 87, 195.1, 262, 19, 120–125, 455/69; 342/42, 51; 340/572.1, 572.2
See application file for complete search history.

(56) References Cited

U.S. PATENT DOCUMENTS

| 5,206,639 A | 4/1993 | Kameus |
| 5,287,112 A | 2/1994 | Schuermann |
| 5,374,930 A | 12/1994 | Schuermann |
| 5,451,958 A * | 9/1995 | Schuermann ............ 342/42 |
| 5,481,262 A | 1/1996 | Urbas et al. |
| 5,698,838 A | 12/1997 | Yamaguchi |
| 6,161,762 A | 12/2000 | Bashan et al. |
| 6,321,067 B1 | 11/2001 | Suga et al. |
| 6,404,325 B1 | 6/2002 | Heinrich et al. |
| 6,480,099 B1 | 11/2002 | Zielger |
| 6,538,564 B1 | 3/2003 | Cole et al. |
| 6,944,424 B2 | 9/2005 | Heinrich et al. |

FOREIGN PATENT DOCUMENTS

| DE | 281699 | 8/1990 |
| EP | 0 242 906 A1 | 10/1987 |
| EP | 0 242 906 B1 | 10/1987 |
| EP | 0 732 663 A2 | 9/1996 |
| EP | 0 732 663 B1 | 9/1996 |
| JP | 1-298817 | * 12/1989 |
| JP | 08-094745 | 4/1996 |

* cited by examiner

Primary Examiner—Eugene Yun
(74) Attorney, Agent, or Firm—Winstead PC

(57) ABSTRACT

A transceiver according to the invention has application to a baggage handling system, amongst others, and includes an electrical circuit having a modulated series resistor, in the form of resistor R(modulator). Also included is a parallel switch SW1, which is placed between the antenna and a storage capacitor in the AC part of the circuit. In other embodiments the modulated series resistor, again in the form of resistor R(modulator) and parallel switch SW1, is placed between the antenna and the storage capacitor in the DC part of the circuit. Both circuits produce the same transmitted signal, although in practice the latter is simpler to implement due to its DC operating bias. In still further embodiments a modulated series resistor is placed between the antenna and the antenna's tuning capacitor.

35 Claims, 22 Drawing Sheets

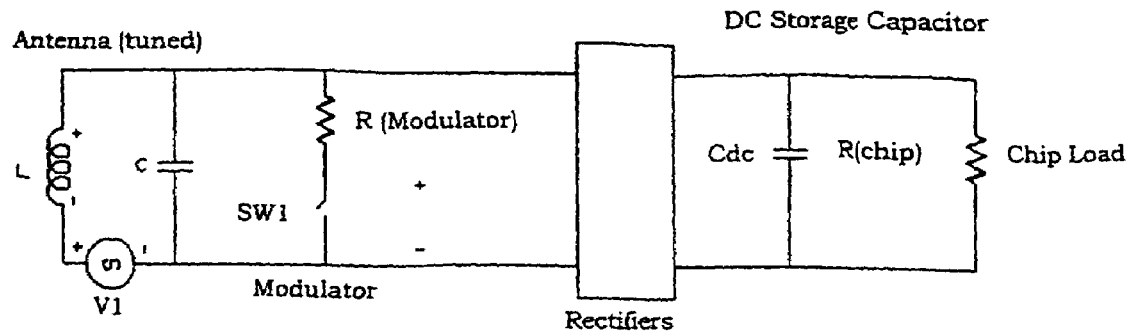
Figure 1: Prior Art Transponder
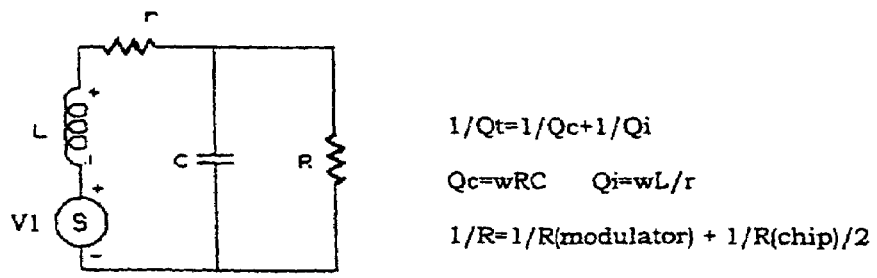
$1/Q_t = 1/Q_c + 1/Q_i$
$Q_c = wRC \quad Q_i = wL/r$
$1/R = 1/R(\text{modulator}) + 1/R(\text{chip})/2$
Figure 2: Tuned Circuit Model
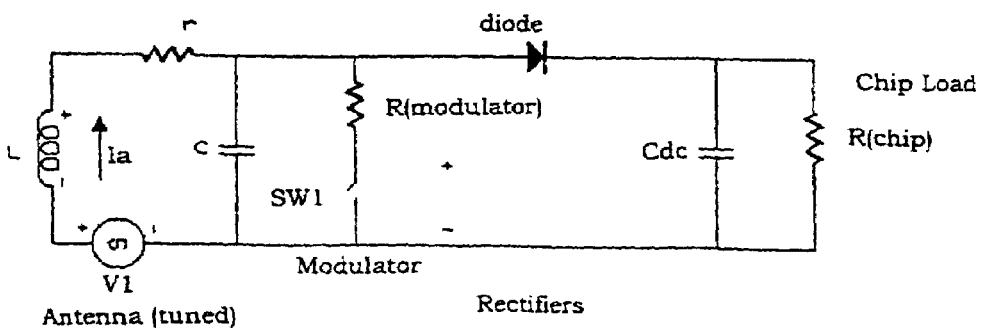
Figure 3: Electrical Model for Prior Art Circuit

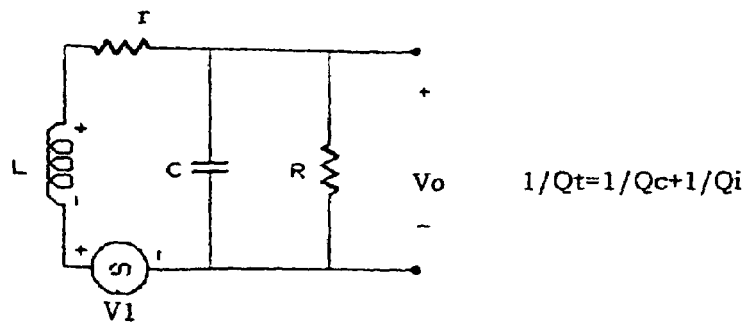
Figure 4(a): Data Rate Limited due to Q factor
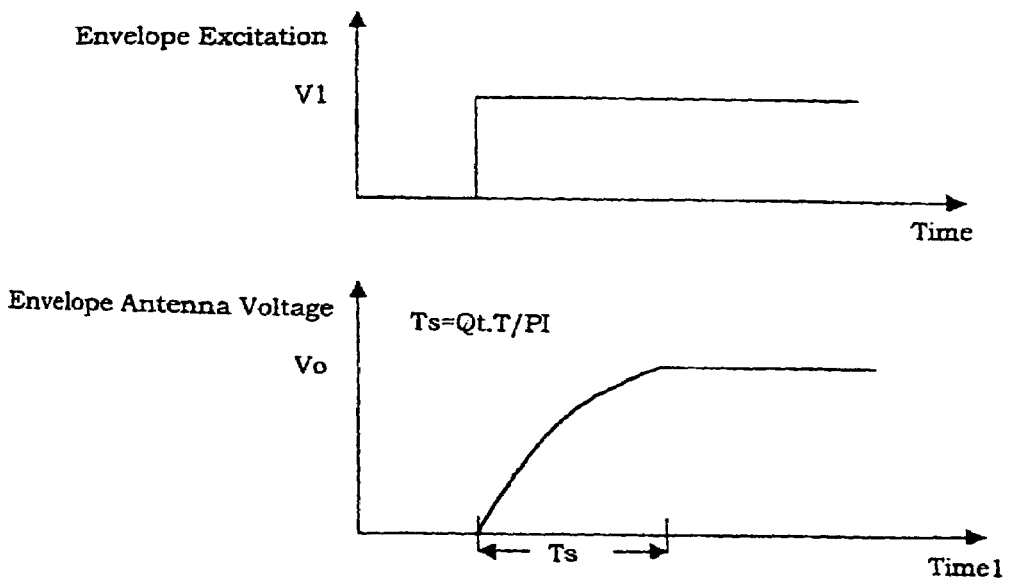
Figure 4(b): Envelope of Waveform associated with Q factor
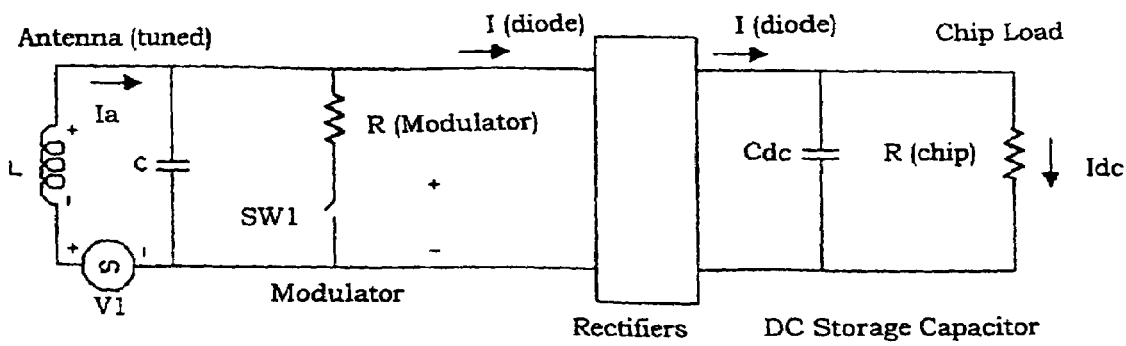
Figure 4(c): Data Rate Limit due to DC Storage System

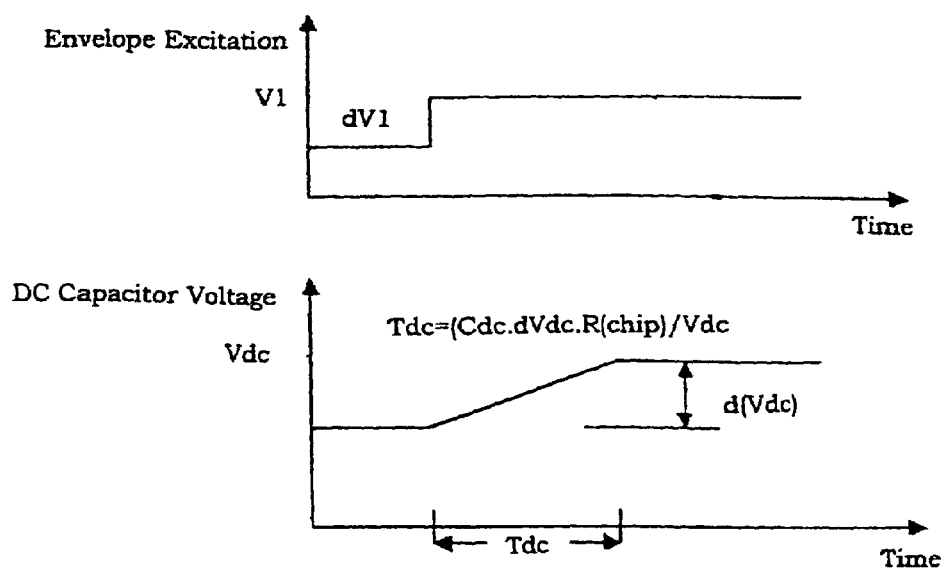
Figure 4(d): DC Waveform associated with DC Storage Limit

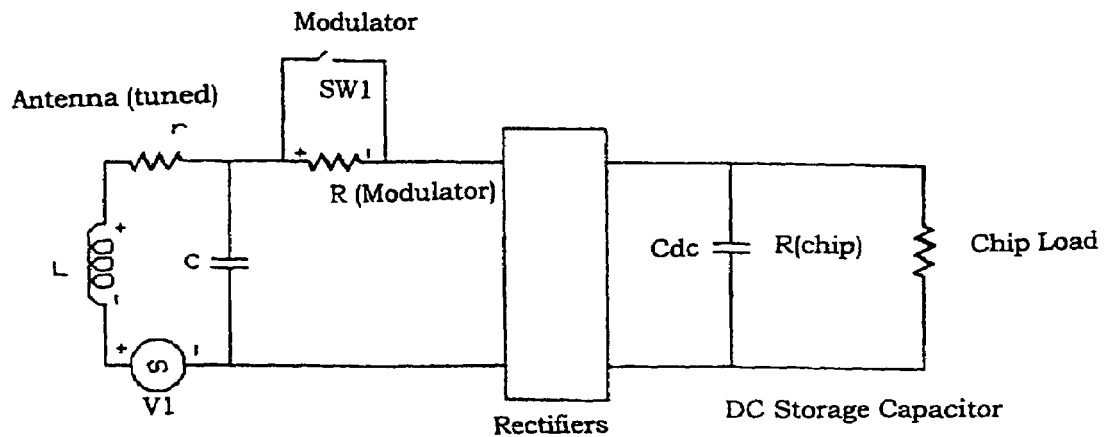
Figure 5(a): Invention with Modulator in AC part of Circuit
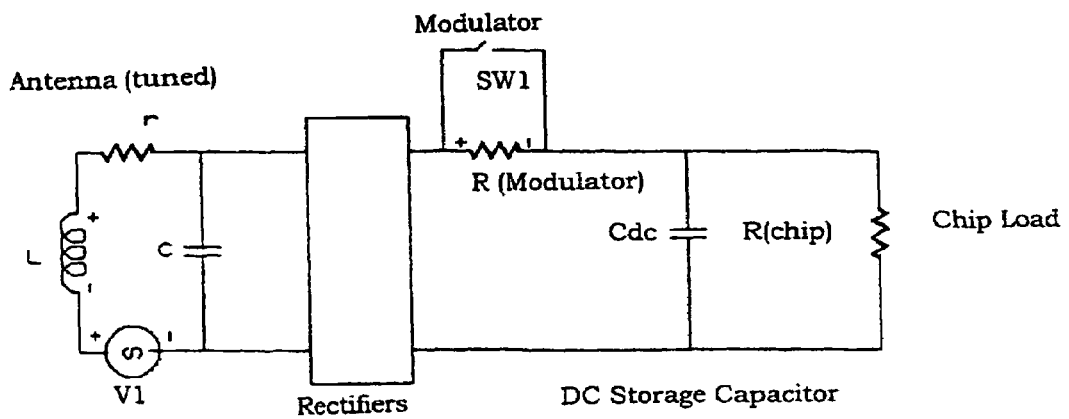
Figure 5(b): Invention with Modulator in DC part of Circuit

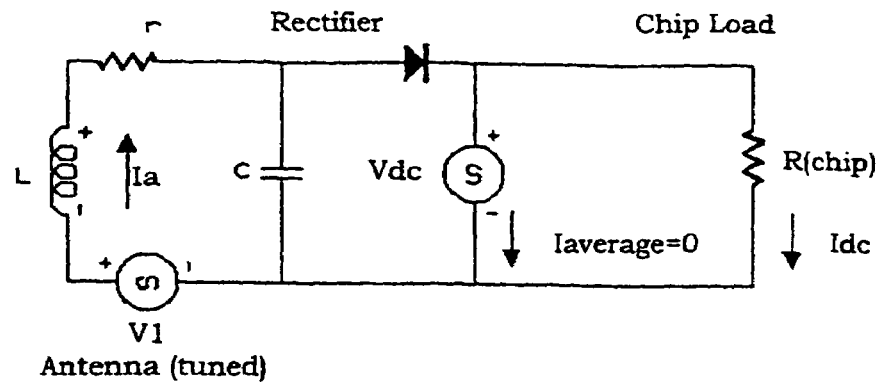
Figure 6(a): Electrical Model for Invention with SW1 Closed
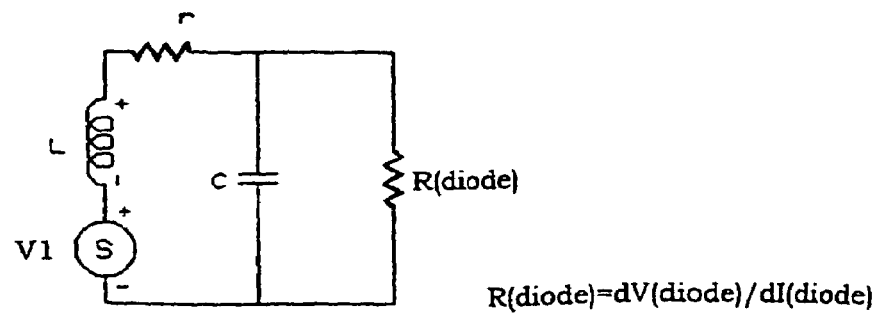
$R(diode)=dV(diode)/dI(diode)$
Figure 6(b): Electrical Model for Invention with SW1 Closed

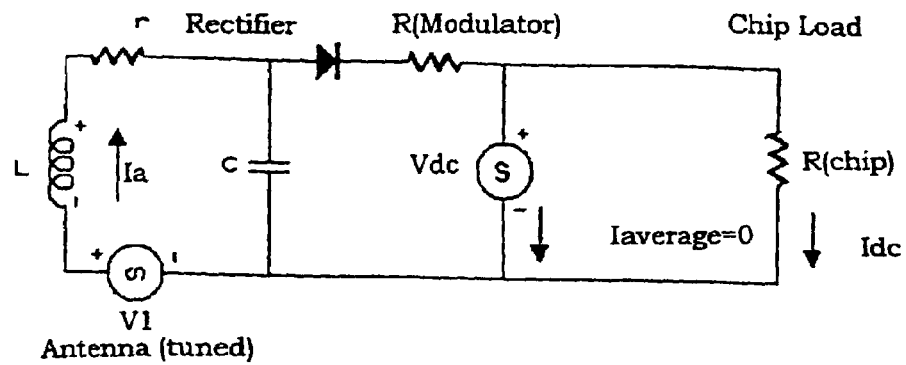
Figure 7(a): Electrical Model for Invention with SW1 Open
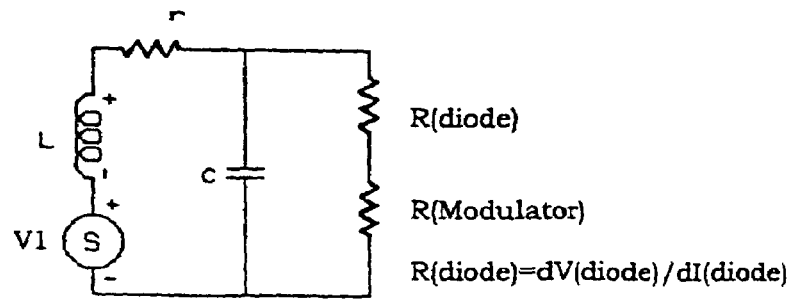
Figure 7(b): Electrical Model for Invention with SW1 Open

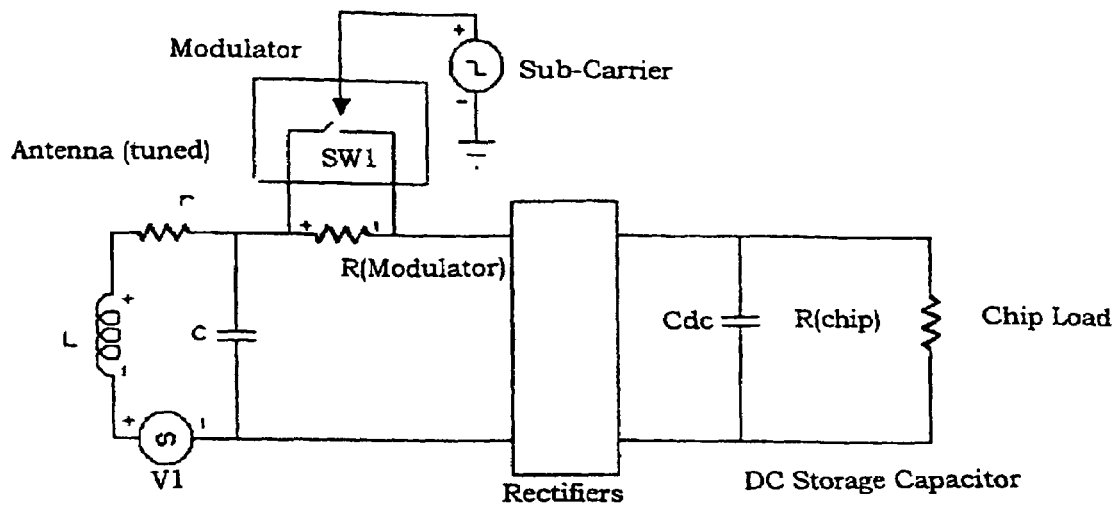
Figure 8(a): Invention with Sub-Carrier Modulation of Modulator in AC Circuit
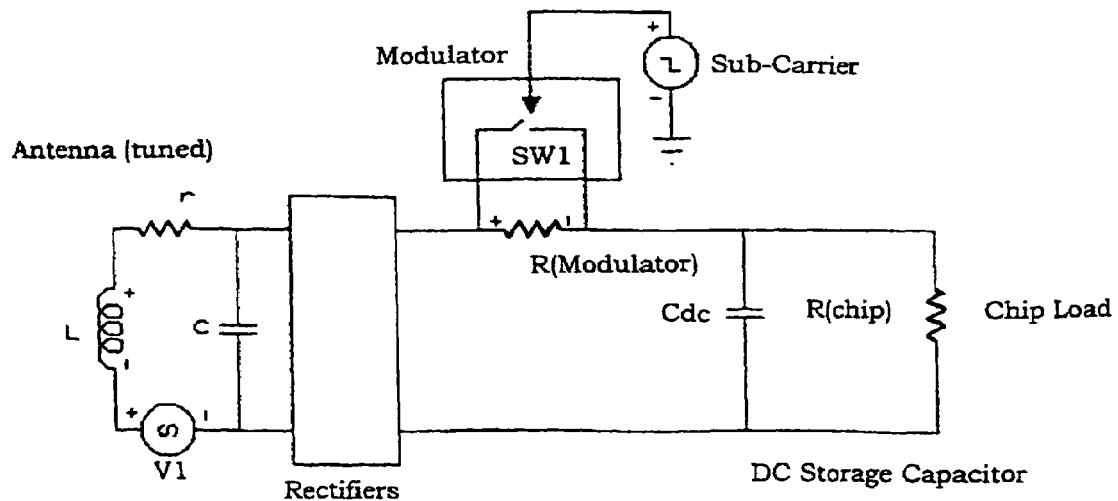
Figure 8(b): Invention with Sub-Carrier Modulation of Modulator in DC Circuit

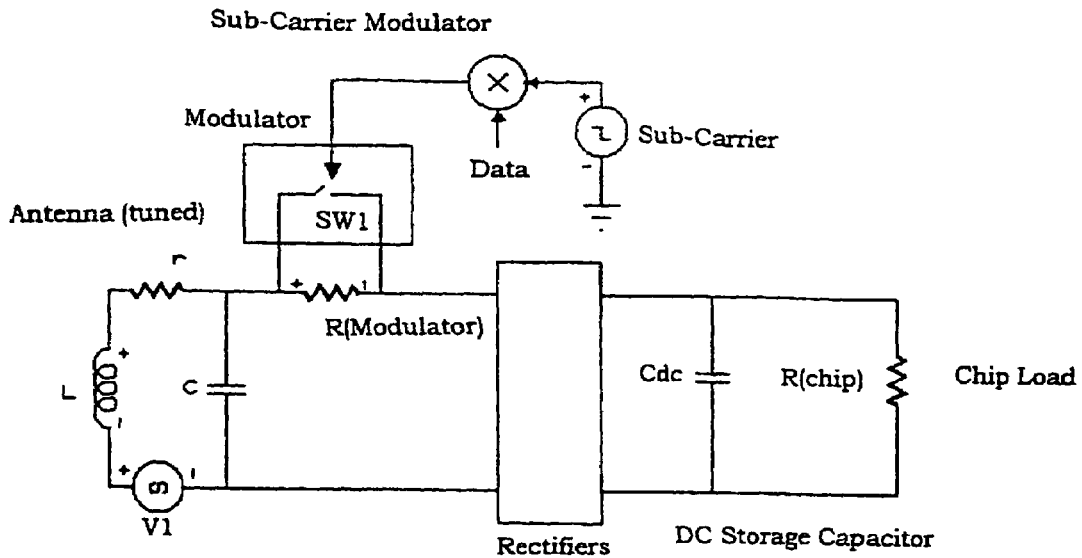
Figure 9(a): Invention with Data Modulated onto Sub-Carrier with Modulator in AC Circuit
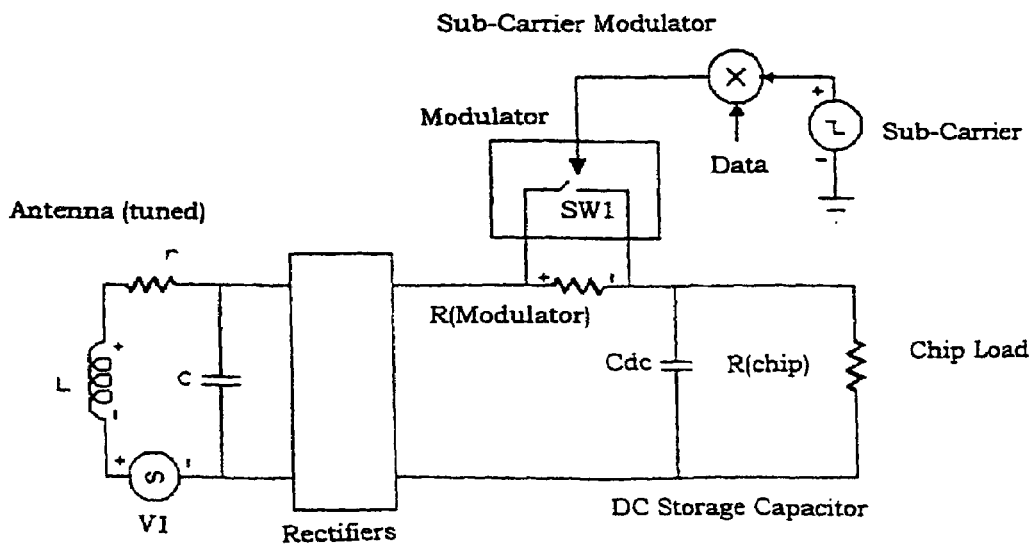
Figure 9(b): Invention with Data Modulated onto Sub-Carrier with Modulator in DC Cirucit

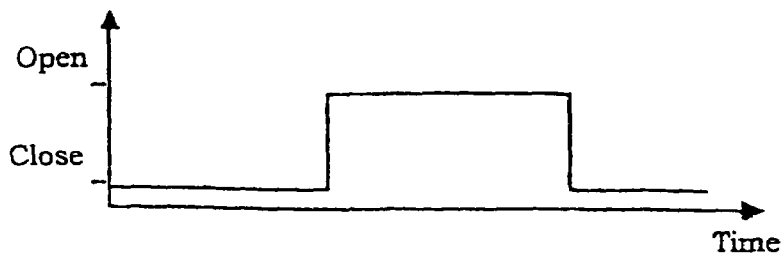
Figure 10(a): Switch Function
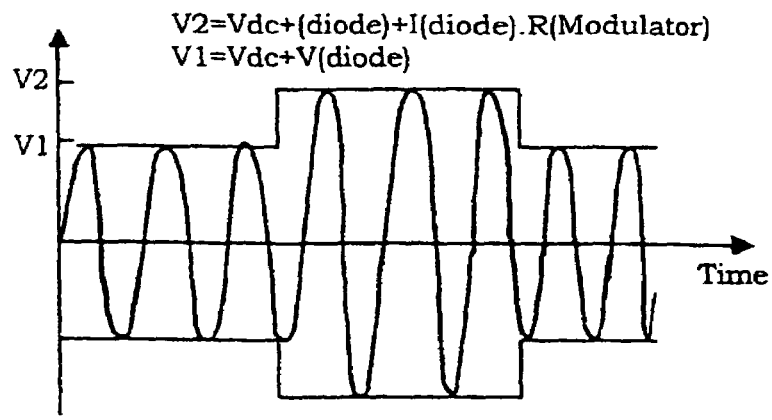
Figure 10(b): Antenna Voltage
Figure 10(c): Sub-Carrier Spectrum
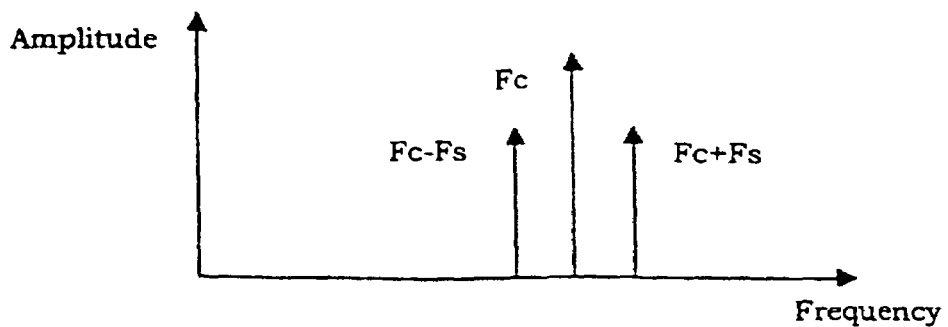
Figure 10(d): Sub-Carrier Amplitude Modulation Sidebands

Figure 10(e): Data Spectrum
Figure 10(f) Data Spectrum Modulated onto Sub-Carrier
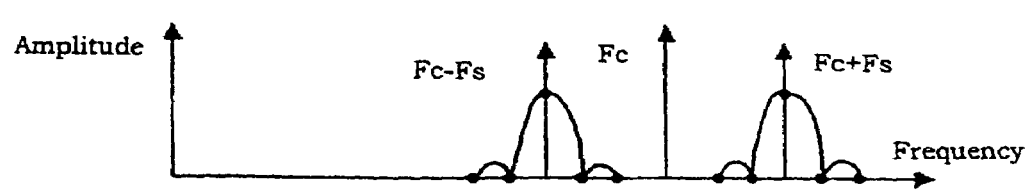
Figure 10(g): Spectrum Data Modulated Sub-Carrier Amplitude Modulated onto Excitation Frequency

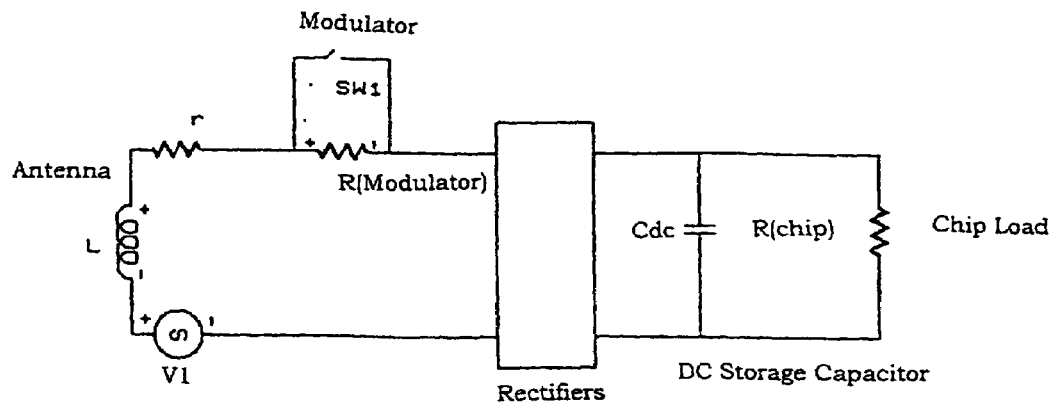
Figure 11(a): Invention with Modulator in AC part of Circuit where Antenna is Untuned
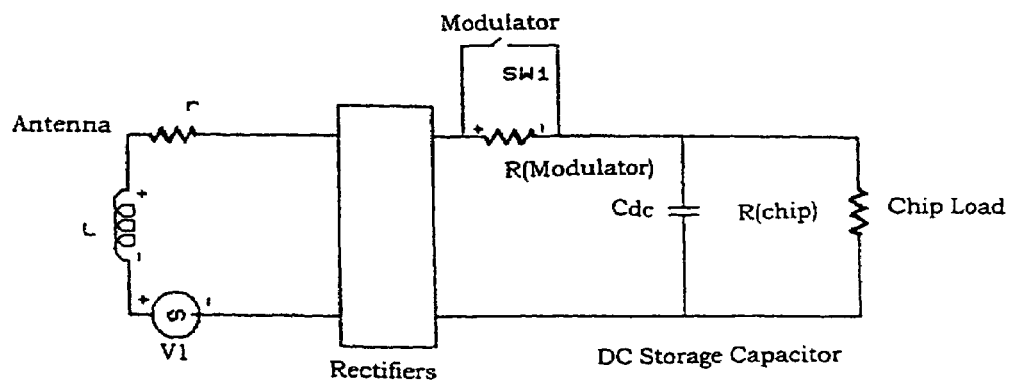
Figure 11(b): Invention with Modulator in DC part of Circuit where Antenna is Untuned

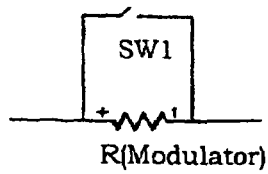
Figure 12(a) Simple Switch Modulator
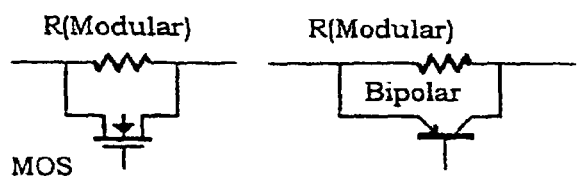
Figure 12(b): Examples of Modulation Swtitches
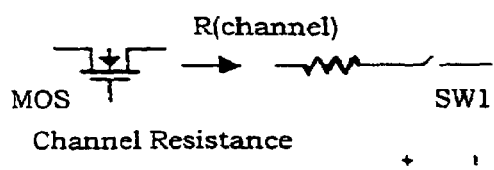
Figure 12(c): Use of Channel Resistance to make Switchable Resistances
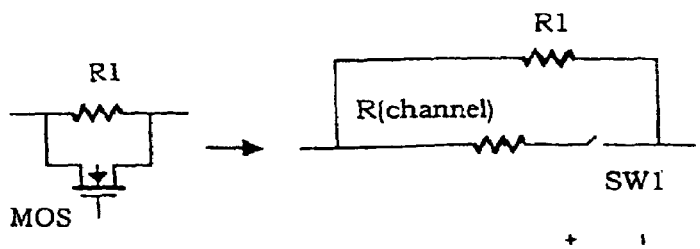
Figure 12(d): Resistance varied between Two Values

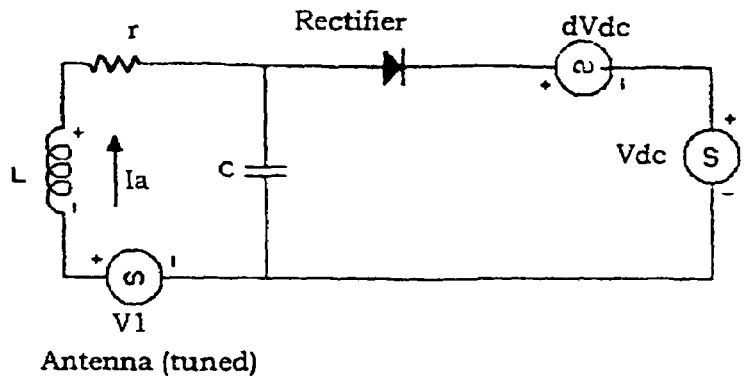
Figure 13(a): Electrical Model for Small change in DC Storage Voltage
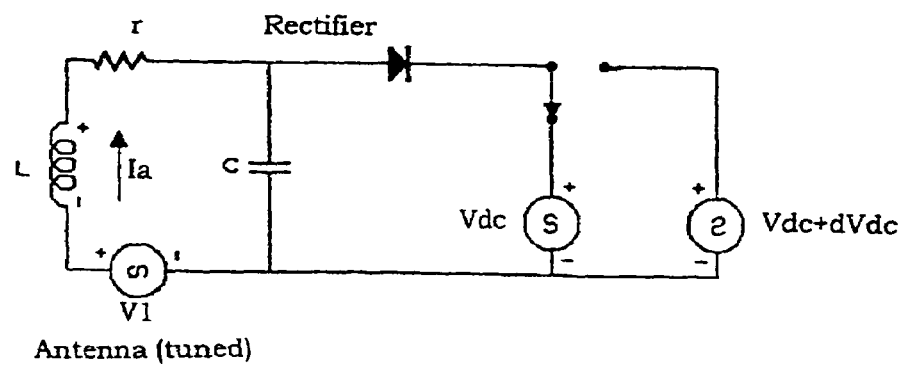
Figure 13(b): Electrical Model for Step Change in DC Voltage
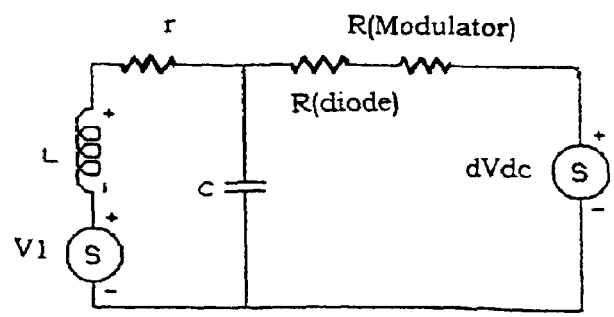
Figure 14: Electrical Model for Compensation Theorem Derive Modulator

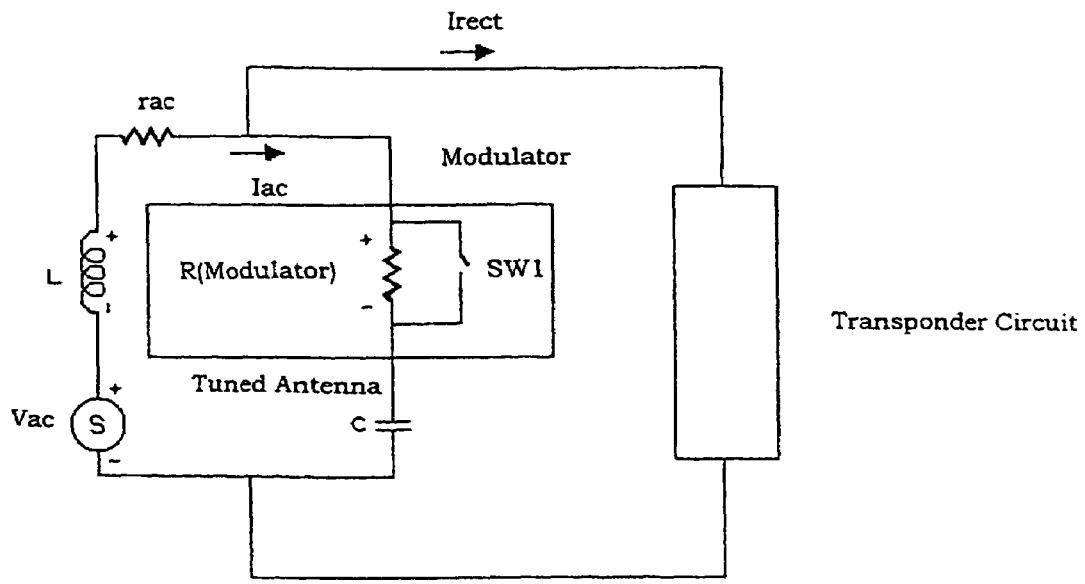
Figure 15(a): Invention with Transponder connected across Coil
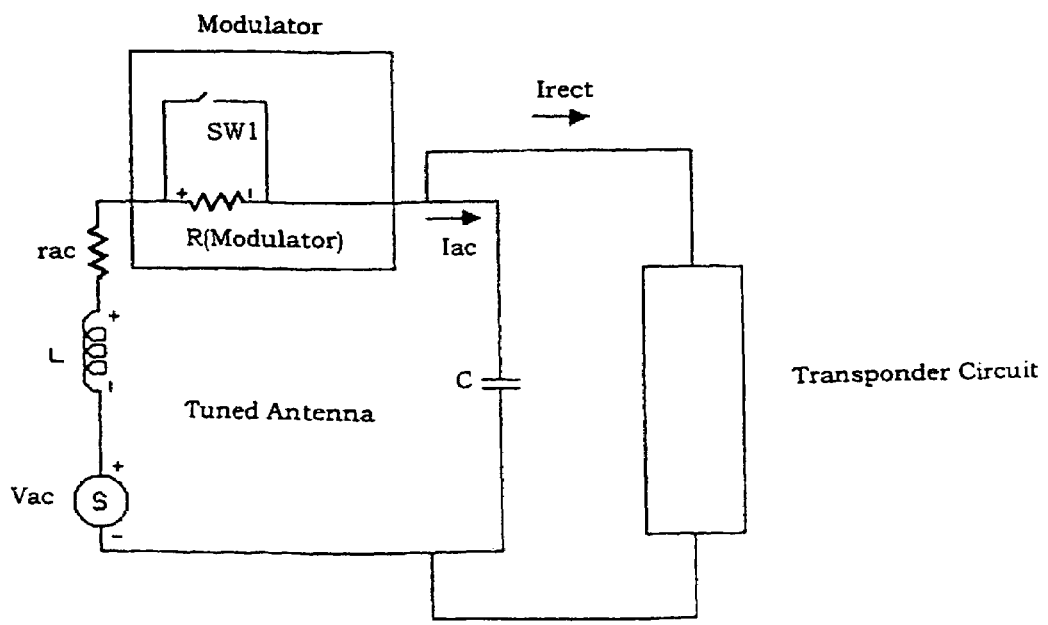
Figure 15(b): Invention with Transponder connected across Tuning Capacitor

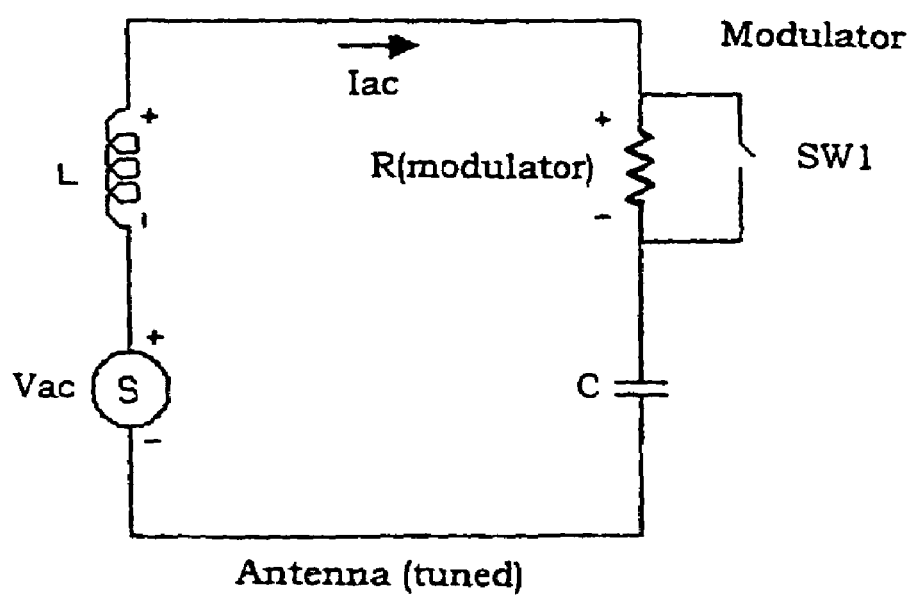
Figure 16: Embodiment of Invention

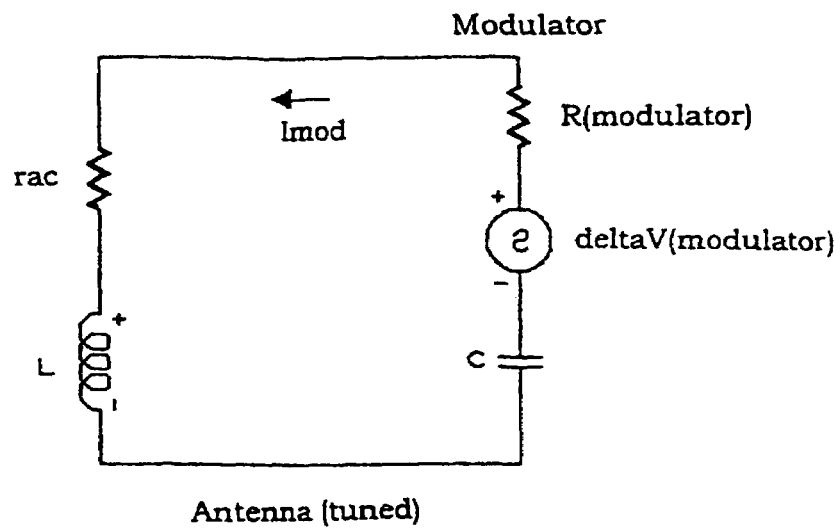
Figure 17(a): Electrical Model of the Invention at Tuned Frequency
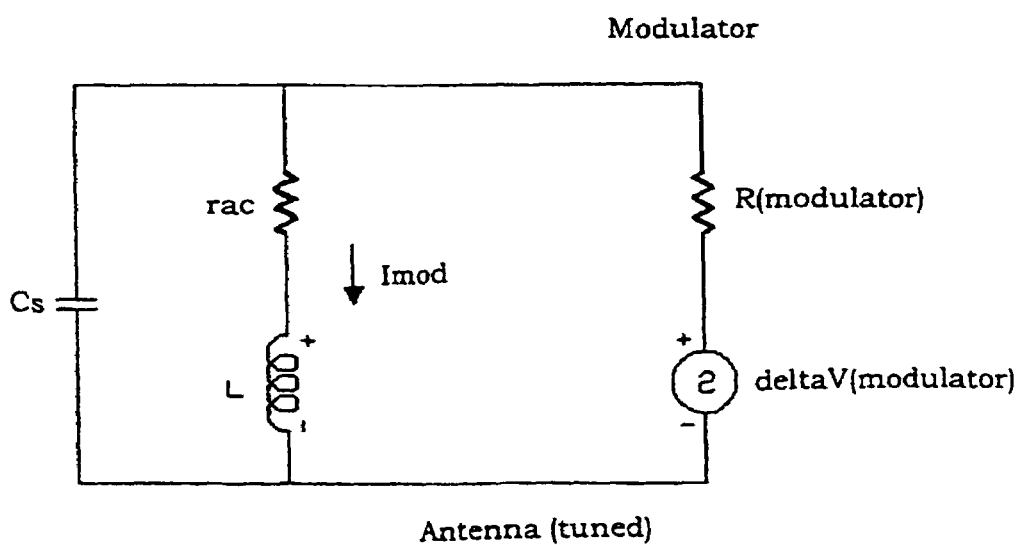
Figure 17(b): Electrical Model of the Invention at Radio Frequency

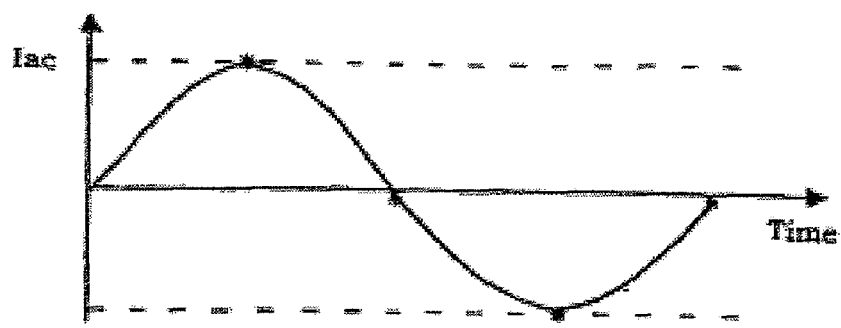
Figure 18(a): Coil Resonant Current Iac
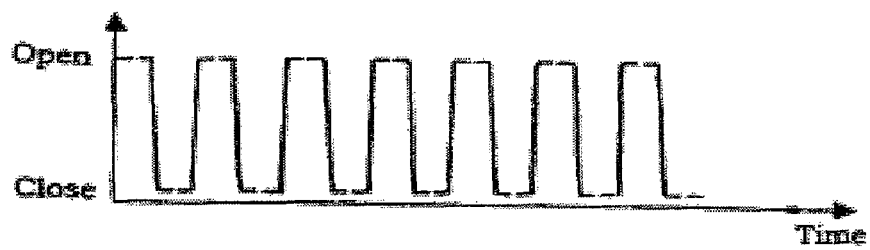
Figure 18(b): Switch Function
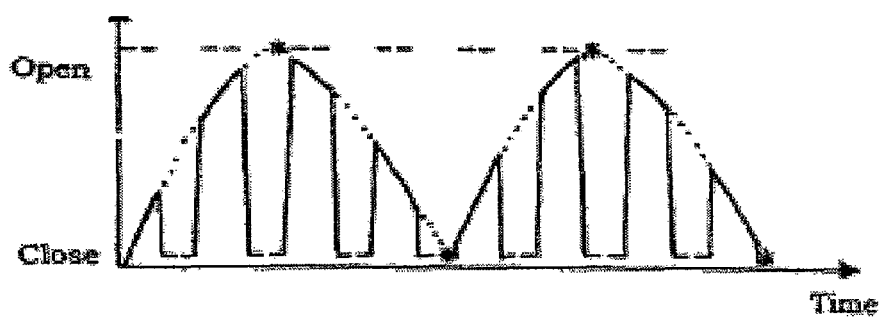
Figure 18(c): Magnitude of V(modulator)
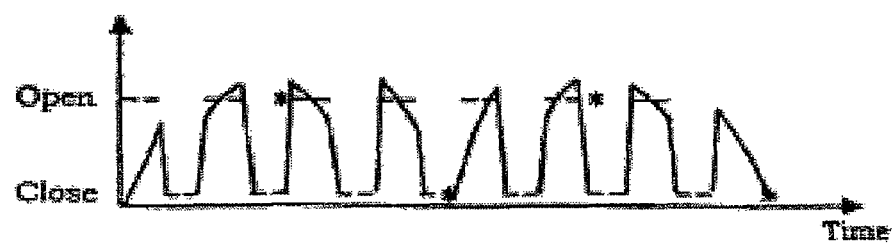
Figure 18(d): Magnitude of V(modulator) with Waveshaping

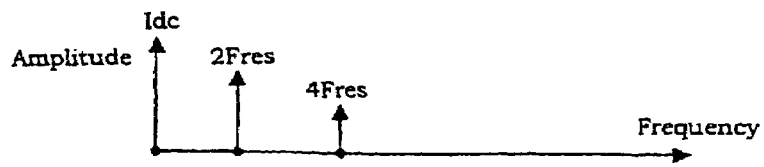
Figure 19(a): Spectrum of Iac Fullwave Rectified
Figure 19(b): Carrier Modulated with Data
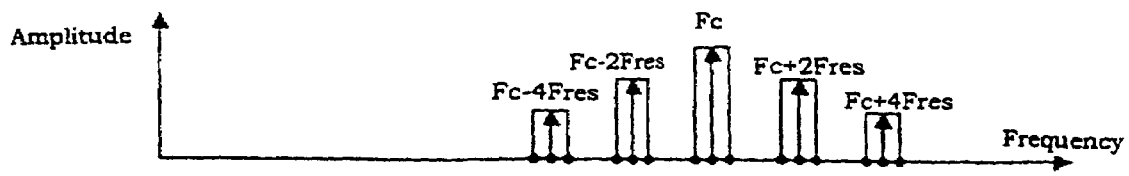
Figure 19(c): Spectrum of V(modulator)
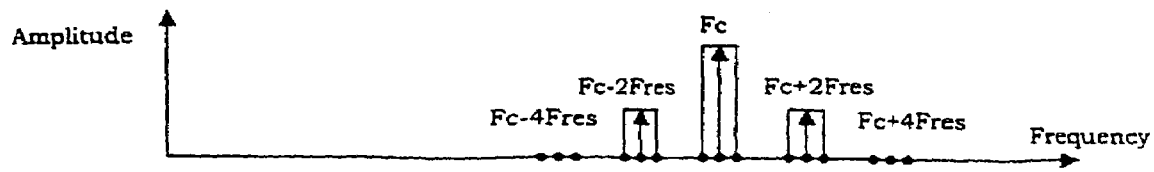
Figure 19(d): Spectrum of V(modulator) with Waveshaping

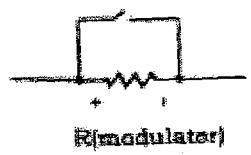
Figure 20(a): Simple Switch Modulator
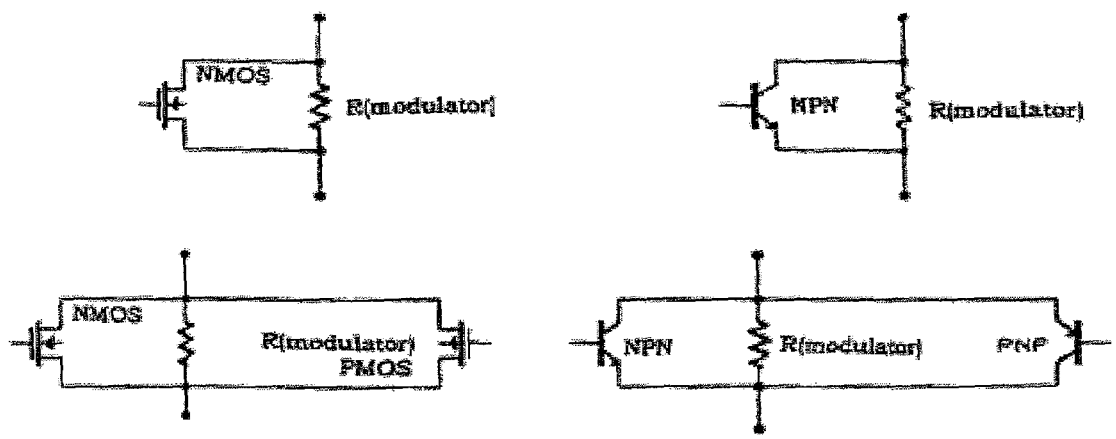
Figure 20(b): Examples of Modulation Switches
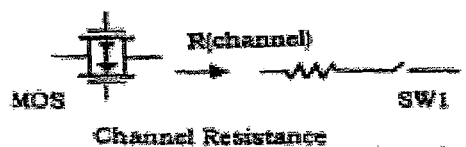
Figure 20(c): Use of Channel Resistance to make Switchable Resitances
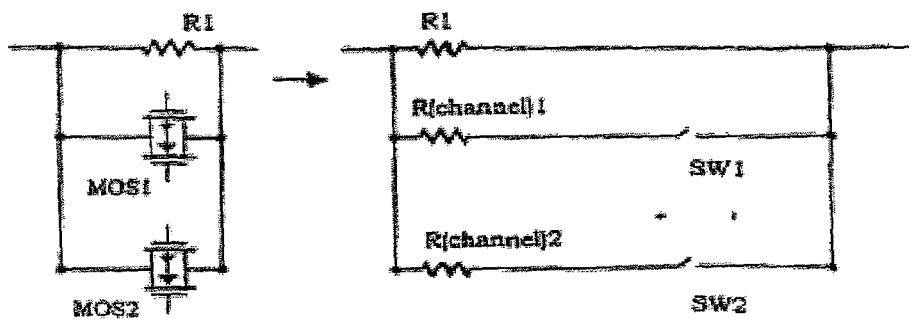
Figure 20(d): Resistance varied between several values

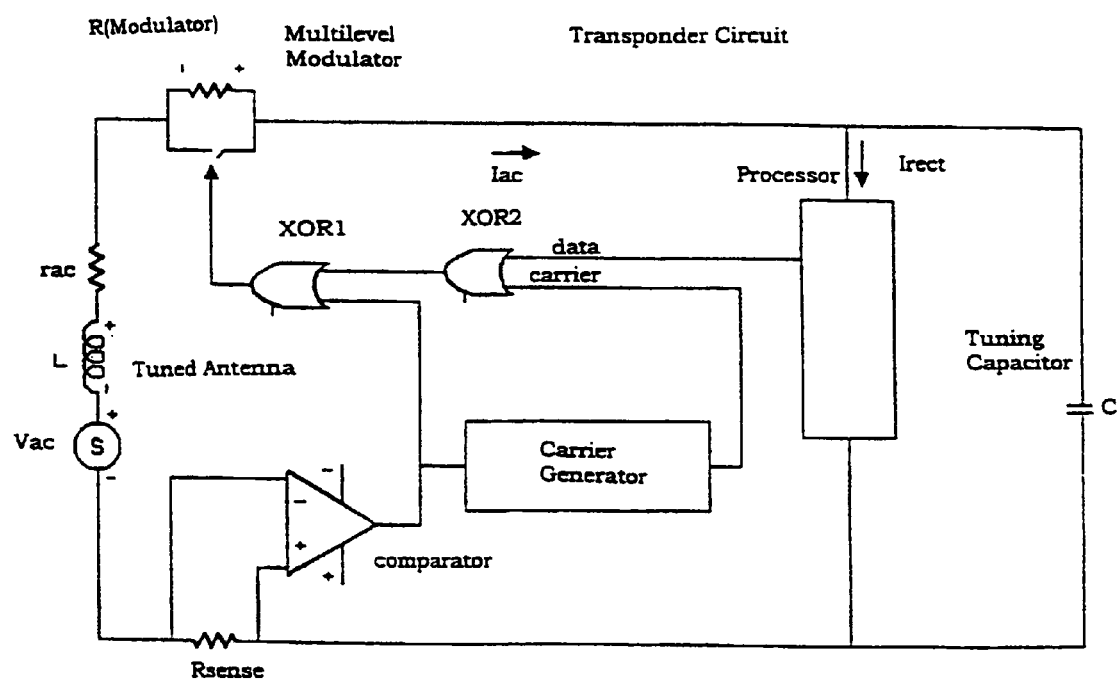
Figure 21: Circuit embodiment of Invention

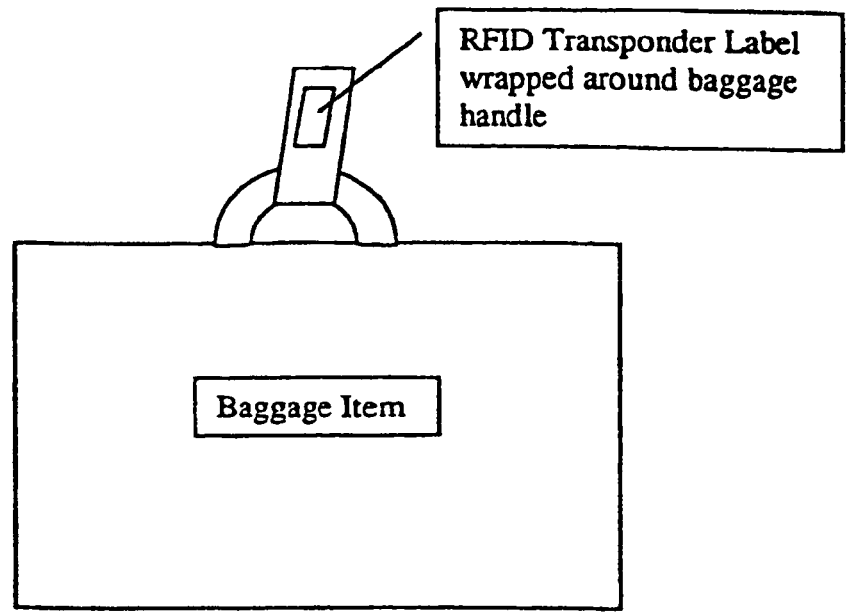
Figure 22 : Baggage item with RFID transponder label
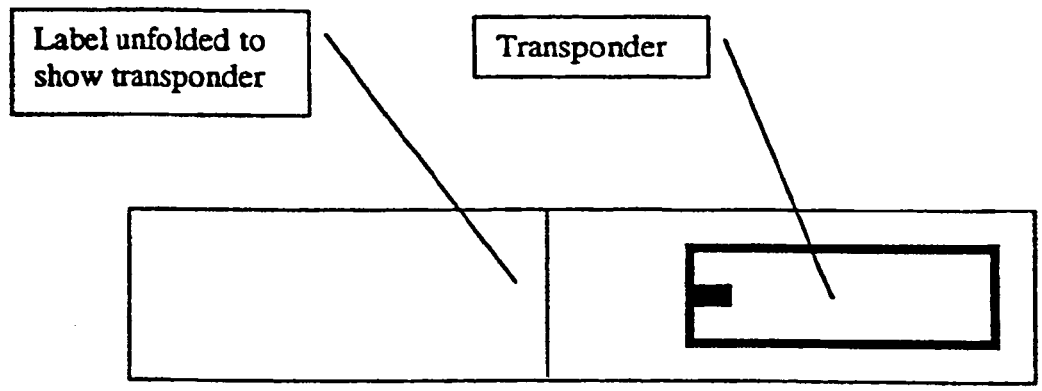
Figure 23 : RFID transponder on baggage label

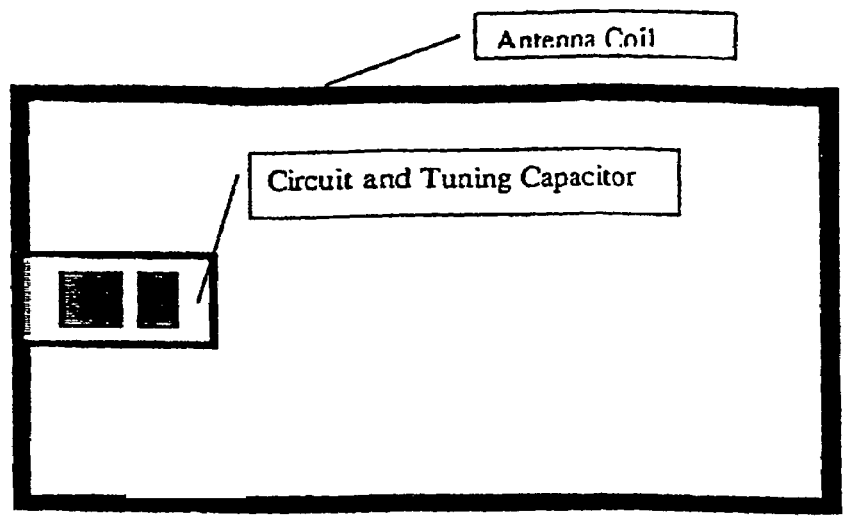
Figure 24 : Transponder Antenna Coil, Tuning Capacitor and Circuit
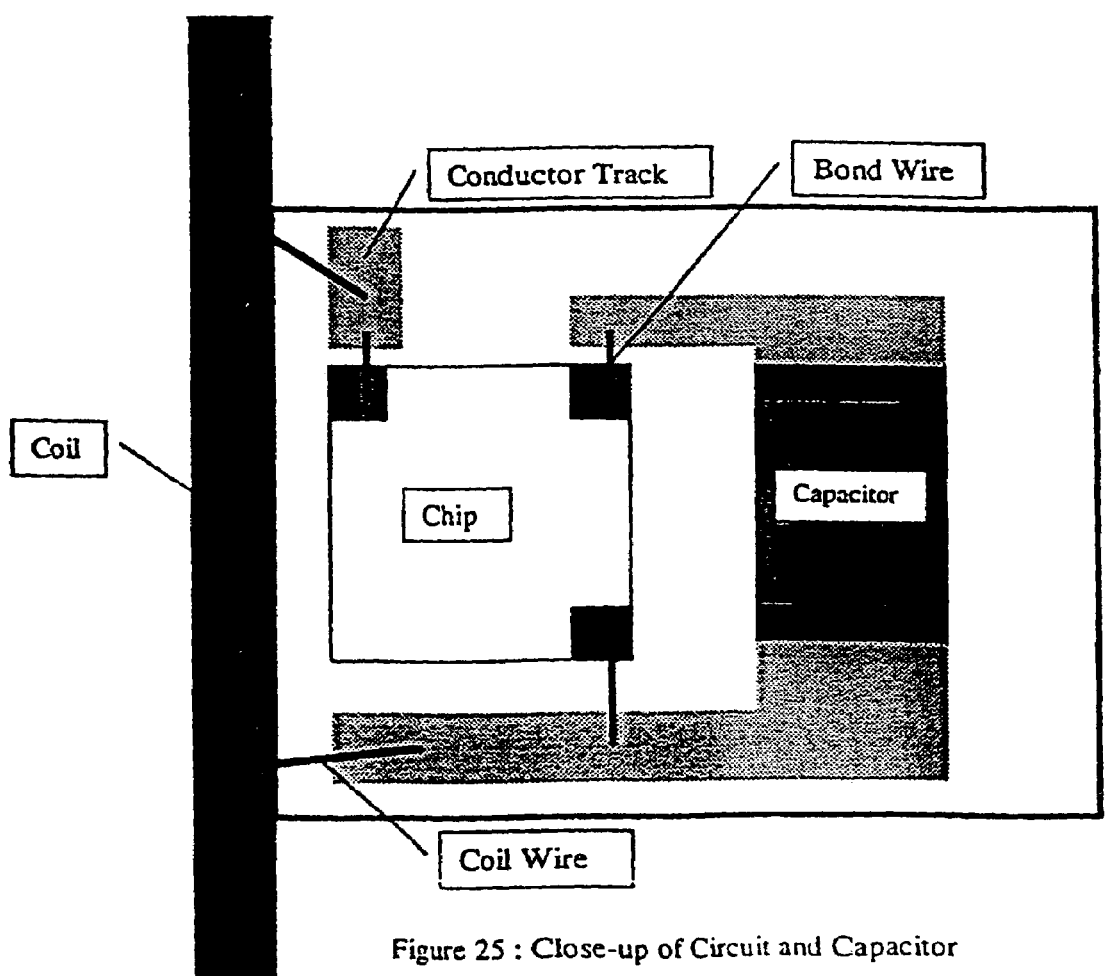
Figure 25 : Close-up of Circuit and Capacitor

TRANSCEIVER

FIELD OF THE INVENTION

The present invention relates to a transceiver.

The invention has been developed primarily for the field of Radio Frequency Identification (RFID) and will be described hereinafter with reference to that application. It will be appreciated, however that the invention is also applicable to other fields. More particularly, the invention is applicable to receiving and transmitting data to and from a transponder using a single antenna, where the transmission may occur at any number of distinct frequencies. The invention has particular merit when applied to passive transponders. That is, transponders which derive their operating power from the received excitation or interrogation signal.

BACKGROUND OF THE INVENTION

In prior art systems passive RFID transponders have included a receiving antenna and a transmitting antenna. The need for separate antennae adds to the cost and complexity of the transponder. To address this limitation a number of single antenna transponders have been developed. That is, the transponder's antenna is used to both receive signals and transmit signals. Generally, these antennae are tuned to the received or interrogating frequency and, as such, the transmitted frequency can not differ greatly from the received frequency otherwise the antennae will not broadcast the transmitted signal efficiently. To transmit data at a high speed a low efficiency low Q antenna is required, however, to receive signals with high efficiency a high Q antenna is required. This contradiction precludes the use of a high efficiency antenna for high speed data transmission. The transmission efficiency of all these systems is degraded by this tuning arrangement and otherwise compromised by the stray capacitance of the antenna coil. Additionally, in passive transponders the electrical inertia of the power storage system limits the data rate. Examples of such known systems are disclosed in AU 55902/86, U.S. Pat. No. 4,546,241, U.S. Pat. No. 4,517,563, U.S. Pat. No. 4,075,632, U.S. Pat. No. 4,038,653, U.S. Pat. No. 3,832,530 and U.S. Pat. No. 3,299,424

DISCLOSURE OF THE INVENTION

It is an object of the present invention, at least in the preferred embodiments, to overcome or substantially ameliorate one or more of the deficiencies of the prior art or at least to provide a useful alternative.

According to one aspect of the invention there is provided a transceiver including:

an antenna for receiving a first signal and transmitting a second signal;

signal processor means for receiving from the antenna a third signal indicative of the first signal; and modulator means disposed between the antenna and the signal processor means for providing a fourth signal to the antenna for forming the second signal, the modulator means varying the impedance between the antenna and the signal processor means for providing the antenna with a dual Q factor, the Q factor being high for the first signal and low for the second signal.

It will be appreciated that the terms "high" and "low", when used in conjunction with a Q factor, should be construed in a sense relative to each other and not necessarily to an absolute range of possible Q factors.

According to a second aspect of the invention there is provided a method for operating a transceiver including the steps of:

providing an antenna for receiving a first signal and transmitting a second signal;

providing signal processor means for receiving from the antenna a third signal indicative of the first signal;

providing a fourth signal to the antenna for forming the second signal; and varying the impedance between the antenna and signal processor means for providing the antenna with a dual Q factor, the Q factor being high for the first signal and low for the second signal.

Preferably, the transceiver is a transponder and the first and second signals are modulated at a first frequency and a second frequency respectively, wherein the first and second frequencies are different. More preferably, the transponder is passive and the signal processor means includes processing circuitry and power storage means, wherein some of the power provided by the third signal is stored in the power storage means for subsequently powering the transponder.

Preferably also, the modulator means varies the impedance between the antenna and the signal processor means between a high and a low value to effect a high and a low Q factor for signals respectively received by and transmitted from the antenna. Even more preferably, the impedance is varied between the high and the low value at a rate greater than the DC slew rate for the third signal. Most preferably, the impedance is a resistance.

In a preferred form the antenna is a coil which is tuned by a capacitor. More preferably, to generate the second signal the voltage across the antenna is modulated or varied in a predetermined manner. This variation in antenna voltage corresponds to a proportional variation in the antenna coil current. That is, $d(I)=d(V)wL$. Even more preferably, the modulator means varies a low impedance which is disposed in series between the antenna and the signal processor means to cause a variation in the voltage across the antenna. More preferably again, the low impedance is less than 10% of the total load impedance seen by the antenna.

In some preferred embodiments the series resistance is modulated with an RF sub-carrier and data is modulated onto the sub-carrier for transmission. In these embodiments the variation or modulation of this series resistance causes rapid changes in the antenna voltage and, hence, to the antenna current, which are not limited by the antenna Q factor or by the storage means. Moreover, the antenna simultaneously has a high Q factor to receive power and a low Q factor to transmit data.

In a preferred form the transceiver allows the transmission rate of data to be decoupled from both the Q factor of the antenna and the capacity of the DC storage means.

According to a third aspect of the invention there is provided a passive transponder including:

an antenna for receiving and transmitting a first signal and a second signal respectively;

signal processor means for: receiving a third signal from the antenna which is derived from the first signal; and providing a fourth signal derived from the third signal;

power storage means in parallel with the signal processor means for absorbing some of the power of the third signal, the absorbed power being subsequently used by the transponder;

modulator means disposed between the antenna and the power storage means for selectively varying the impedance therebetween to generate the second signal; and a mixer for producing a fifth signal by combining the fourth signal with a sub-carrier, the fifth signal being provided to the modulator means.

Preferably, the modulator means varies the impedance in accordance with the fifth signal. More preferably, the impedance is a resistance.

In a preferred form the power storage means includes a capacitor.

According to a fourth aspect of the invention there is provided an antenna for receiving and transmitting a first signal and a second signal respectively, the antenna including:

a tuned coil in which the first signal generates a first current and which supports a second current for generating said second signal; and modulator means through which said first and second currents flow for providing said coil with a dual Q factor, the Q factor being high for the first current and low for the second current.

Preferably, the first current or a signal derived from the first current is provided to a signal processing means. More preferably, the modulator means varies the impedance between the coil and the processing means. Even more preferably, the impedance is a resistance which is switched between a predetermined value and zero resistance.

According to a fifth aspect of the invention there is provided a transceiver including:

an antenna for receiving a first signal and transmitting a second signal;

signal processor means for receiving from the antenna a third signal indicative of the first signal; and modulator means disposed between the antenna and the signal processor means for providing a fourth signal to the antenna for forming the second signal, the modulator means varying the voltage across the antenna in a substantially stepwise manner to affect a variation in the current flowing through the antenna between a low and a high value for allowing transmission of the second signal without substantially affecting the receiving efficiency of the antenna.

According to a sixth aspect of the invention there is provided a method for operating a transceiver including the steps of:

providing an antenna for receiving a first signal and transmitting a second signal;

providing signal processor means for receiving from the antenna a third signal indicative of the first signal;

providing a fourth signal to the antenna for forming the second signal; and varying the voltage across the antenna in a substantially stepwise manner to affect a variation in the current flowing through the antenna between a low and a high value for allowing transmission of the second signal without substantially effecting the receiving efficiency of the antenna.

Preferably, the first signal includes a carrier signal and the variation of the current between the low and the high value occurs within less than or about one period of the carrier signal.

According to a seventh aspect of the invention there is provided a transceiver including:

an antenna for receiving a first signal having a first predetermined frequency and, in response thereto, generating a second signal;

receiving circuitry being responsive to the second signal;

tuning circuitry for providing the antenna with a resonant frequency at or about the first predetermined frequency; and a modulator disposed between the antenna and the tuning circuitry for varying the impedance therebetween such that the second signal generates a third signal in the antenna at a second predetermined frequency and the antenna transmits a fourth signal derived from the third signal.

Preferably, the first and second predetermined frequencies are substantially different.

Preferably also, the antenna includes a coil and the tuning circuit includes a capacitor connected in parallel with the coil. More preferably, the antenna consists of a coil and the tuning circuit consists of a capacitor. Even more preferably, the modulator is connected in series with the capacitor.

In a preferred form, the receiving circuitry, in response to the second signal, actuates the modulator to provide the third signal. More preferably, the third signal is modulated in accordance with a data signal specific to that transceiver. Even more preferably, the data signal is stored in the receiving circuitry and selectively provided to the modulator.

Preferably, the second signal is the current generated in the antenna by the first signal. In other embodiments, however, the second signal is the voltage induced across the tuning circuitry by the first signal.

According to an eighth aspect of the invention there is provided a tuned antenna including:

a coil for receiving a first signal having a first predetermined frequency;

a capacitor connected in parallel with the coil for providing the antenna with a resonant frequency at or about the first predetermined frequency; and a modulator disposed in series with the capacitor for providing a varying impedance such that the second signal generates a third signal in the coil at a second predetermined frequency whereby the coil transmits a fourth signal derived from the third signal.

According to a ninth aspect of the invention there is provided a method for receiving and transmitting a first signal and a fourth signal respectively to and from a transceiver, the method including the steps of:

receiving the first signal with an antenna and, in response thereto, generating a second signal, the first signal having a first predetermined frequency;

providing the second signal to receiving circuitry, tuning the antenna with tuning circuitry to have a resonant frequency at or about the first predetermined frequency; and varying the impedance between the antenna and the tuning circuitry such that the second signal generates a third signal in the antenna at a second predetermined frequency and the antenna transmits a fourth signal derived from the third signal.

According to another aspect of the invention there is provided a method for receiving and transmitting a first signal and a fourth signal respectively, the method including the steps of:

receiving the first signal with a coil having a first predetermined frequency;

connecting a capacitor in parallel with the coil for providing the antenna with a resonant frequency at or about the first predetermined frequency;

generating a second signal from the first signal; and disposing a modulator in series with the capacitor for both providing a varying impedance such that the second signal generates a third signal in the coil at a second predetermined frequency whereby the coil transmits the fourth signal which is derived from the third signal.

Preferably, the antenna is a coil tuned by a capacitor. As will be appreciated by those skilled in the art from the teaching herein, to transmit a signal from this type of single antenna transceiver (also known as a transponder) the current flowing in the coil is modulated or varied in some predetermined manner. Most preferably, this is achieved by the use of a small variable resistance in series between the antenna and the tuning capacitor to cause a variation in the current generated by the coil. In some preferred embodiments the small series resistance is modulated with an RF carrier and data is modulated onto the carrier for transmission by the antenna. Varying or modulating the value of this small resistance causes rapid changes in the current flowing in the coil that are not limited by the antenna tuning. Accordingly, the invention, in these embodiments, allows simultaneous reception at the first predetermined frequency and transmission at a second predetermined frequency different from the first.

Other embodiments of the invention allow transmission of data from the transceiver or transponder at more than two distinct frequencies using a single tuned antenna. These embodiments have particular merit when applied to passive RFID transponders such as those used in a baggage handling system at airports, bus terminals, train stations and the like, and for parcel handling and courier applications.

The preferred embodiments of the invention overcome the prior art limitation of the transmission frequency having to be similar to the receive frequency, as they allow the transmission frequency to be completely decoupled from the tuned receiving frequency of the antenna. This, in turn, enables the transmission of higher or lower frequency signals from transponders with antennas tuned either lower or higher respectively than the transmission frequency.

BRIEF DESCRIPTION OF THE DRAWINGS

Preferred embodiments of the invention will now be described, by way of example only, with reference to the accompanying drawings in which:

FIG. 1 is a schematic circuit diagram of a prior art transceiver or transponder circuit;

FIG. 2 is a schematic representation of an AC electrical model for a tuned coil;

FIG. 3 is a schematic representation of the electrical model for the prior art transponder circuit of FIG. 1;

FIGS. 4(a) to 4(d) show the two mechanisms, with their associated waveforms, that limit the transient response of the prior art passive transponder antenna circuits;

FIGS. 5(a) and 5(b) are schematic representations of two embodiments of the invention where the modulator means includes a modulated resistance in the AC and DC part of the antenna circuit respectively;

FIGS. 6(a) and 6(b) are schematic representations of electrical models for the invention when the modulator switch SW1 is closed;

FIGS. 7(a) and 7(b) are schematic representations of electrical models for the invention when the modulator switch SW1 is open;

FIGS. 8(a) and 8(b) are schematic representations of two other embodiments of the invention where the series resistance is modulated by an RF sub-carrier in the AC and DC part of the antenna circuit respectively;

FIGS. 9(a) and 9(b) are schematic representations of two additional embodiments of the invention where the sub-carrier is modulated with data in the AC and DC part of the circuit respectively;

FIG. 10(a) is a graph which illustrates the switch function utilised by the invention;

FIG. 10(b) is a graph of the antenna voltage;

FIG. 10(c) is a graphical illustration of the frequency spectrum of the sub-carrier;

FIG. 10(d) is a graphical illustration of the frequency spectrum of the sub-carrier side bands;

FIGS. 10(e), (f) and (g) are respective graphical illustrations of the frequency spectrum associated with the data modulated onto the sub-carrier;

FIGS. 11(a) and 11(b) are schematic representations of two other embodiments of the invention where the antenna is an untuned coil and the series resistance is modulated by an RF sub-carrier in the AC and DC part of the antenna circuit respectively;

FIGS. 12(a) to 12(d) are schematic representations of four alternative arrangements for modulating the series resistance;

FIGS. 13(a), 13(b) and 14 are schematic representations of the transceiver according to the invention shown in terms of the Compensation Theorem;

FIGS. 15(a) and 15(b) respectively illustrate schematically two alternative embodiments of a transceiver according to the invention;

FIG. 16 is a schematic circuit diagram of a tuned antenna according to a preferred embodiment of the invention;

FIGS. 17(a) and 17(b) are electrical models of the antenna of FIG. 16 at the tuned frequency and at a higher radio frequency respectively;

FIGS. 18(a), 18(b), 18(c) and 18(d) illustrate various exemplary waveforms for the circuit of FIG. 16;

FIGS. 19(a), 19(b), 19(c), and 19(d) illustrate frequency spectra associated with the waveforms of FIGS. 18(a) to 18(d);

FIGS. 20(a), 20(b), 20(c) and 20(d) illustrate various alternative impedance modulating arrangements;

FIG. 21 is a schematic circuit diagram of another preferred embodiment of a transceiver according to the invention;

FIG. 22 is a schematic representation of a baggage item with a RFID transponder label embodying the invention;

FIG. 23 is an enlarged schematic representation of the label shown in FIG. 22, in the unfolded configuration;

FIG. 24 is a further enlarged schematic representation of the label of FIG. 22 which illustrates more particularly the coil, the tuning capacitor and the receiving circuitry; and FIG. 25 is a still further enlarged schematic representation of the label of FIG. 22 which illustrates more particularly the receiving circuitry and the tuning capacitor.

PREFERRED EMBODIMENTS OF THE INVENTION

In the following explanation of the invention there is description using both the time and frequency domain methods. It will be appreciated by those skilled in the art that the time domain methods provide information on the transient behaviour of the invention while the frequency domain methods are used to interpret the AC electrical behaviour. It will also be appreciated that the terms "transponder" and "transceiver" are used interchangeably.

RFID transponders that incorporate a single antenna may be interrogated with an interrogating or exciting field. This field is received by the transponder's antenna and the voltage induced on the antenna may be rectified and used to power the transponder. It is necessary that the transponder be able to transmit messages back to its interrogator. For single antenna transponders the transmitted signal must be radiated off the same antenna that is used to receive the interrogating signal.

In prior art systems a resistance is provided in parallel with the antenna and is modulated to change the current produced by the antenna. By way of example, FIG. 1 illustrates a prior art system where the antenna coil L is tuned by capacitor C and a resistance $R_{(modulator)}$ is switched in parallel with the coil. A rectifier (either a half or a full wave rectifier is used) converts the AC voltage to a DC voltage which is stored on a DC storage capacitor $C_{dc}$. The transponder circuit load is represented by the load resistor $R_{(chip)}$.

FIG. 2 shows an AC electrical model for the prior art tuned coil. The transient response of the coil is determined by the total Q factor $Q_t$ and:

$$1/Q_t=1/Q_c+1/Q_i \qquad (1)$$

where $Q_c$ is the tuning capacitor Q factor $Q_c$=wRC and $Q_i$ is the coil Q factor given by WL/$r_{ac}$. The resistance R is the equivalent parallel AC resistance of $R_{(modulator)}$ and $R_{(chip)}$ $r_{ac}$ is the series AC resistance of the coil and w is the angular frequency in radians. The time constant $T_s$ for the sinusoidal transient response of this circuit to either sinusoidal excitation or a component parametric change is given by:

$$T_s=2Q_t/w. \qquad (2)$$

The bandwidth (BW) of the tuned circuit is:

$$BW=1/T_s\cdot PI=w/Q_t\cdot 2\cdot PI. \qquad (3)$$

Such a tuned circuit is only able to pass signals within its bandwidth.

FIG. 3 shows the electrical model for the prior art circuit of FIG. 1. The effective load of the signal processor circuitry on the antenna circuit is schematically shown by R(chip) and the modulation resistance is R(modulator). The antenna coil current Ia is given by:

$$Ia=2\cdot Vo\cdot(wC)\cdot Rt \qquad (4)$$

where Vo is the antenna terminal voltage, Rt is the total parallel resistance of R(modulator) and the effective AC load presented by R(chip). The DC load R(chip) presents an effective AC load of R(chip)/2.

The rate of change of current in the antenna is limited by two factors. First, the Q factor of the antenna limits the transient response time constant Ts. Second, the size of the transponder's DC power storage means (the DC storage capacitor). Any change in the antenna current will be matched by a commensurate change in the antenna voltage, which will eventually lead to a change in the DC voltage on the DC storage capacitor. As this represents a change in the energy stored in the DC system a finite time will be required for the antenna circuit to supply the change in energy.

FIGS. 4(a) to 4(d) schematically and graphically illustrate the two limiting mechanisms referred to above. In particular, FIGS. 4(a) and 4(b) show the antenna circuit with a resistive load, and the associated waveforms, respectively. In this configuration the Q factor of the antenna limits the transient response. FIGS. 4(c) and 4(d) show the antenna circuit with a large capacitive load, and its associated waveforms, respectively. In this latter configuration the antenna circuit is connected, via a rectifier, to a DC storage capacitor Cdc and parallel resistive load, where the transient response is limited by the size of the DC storage capacitor and the charging current available from the antenna. The DC current supplied to the load Ii is given by:

$$Ii=Vdc/R(chip) \qquad (5)$$

Therefore a change of d(Vdc) in the capacitor voltage will take a time equal to or longer than:

$$Tdc=d(Vdc)\cdot R(chip)\cdot Cdc/Vdc \qquad (6)$$

where Vdc is the DC output voltage. Particularly reference is made to FIG. 4(d) which illustrates the quantity Tdc.

The preferred embodiments of the invention described below have been developed in answer to these abovementioned limitations. More particularly, illustrated schematically in FIGS. 5(a), 5(b), 15(a) and 15(b) are four preferred embodiments of the invention where corresponding features are represented with corresponding reference numerals or descriptors. In FIG. 5(a) a modulated series resistor, in the form of resistor R(modulator) and parallel switch SW1, is placed between the antenna and the storage capacitor in the AC part of the circuit. In FIG. 5(b) a modulated series resistor, again in the form of resistor R(modulator) and parallel switch SW1, is placed between the antenna and the storage capacitor in the DC part of the circuit. Both circuits produce the same transmitted signal, although in practice the circuit shown in FIG. 5(b) is simpler to implement due to its DC operating bias. In FIGS. 15(a) and 15(b) a modulated series resistor is placed between the antenna and the antenna's tuning capacitor.

Switch SW1 schematically represents a modulation means that varies the impedance of series resistor R(modulator). For simplicity a switch is shown although other means of achieving a controlled variable impedance are used in other embodiments. The switch is modulated with a data signal that can be either a baseband signal or a high frequency sub-carrier with data modulated on to the sub-carrier for transmission. Typically for the embodiments shown in FIGS. 5(a) and 5(b) the sub-carrier frequency is in the range from 1% to 50% of the excitation frequency, where as for the embodiments shown in FIGS. 15(a) and 15(b) the sub-carrier frequency range is from a few hertz to thousands of times the excitation frequency. Additionally, the preferred method of modulating the sub-carrier is Phase Reverse Keying (PRK).

In the preferred embodiments of the invention the envelope of the voltage across the antenna follows the openings and closures of switch SW1. For the embodiments shown in FIGS. 5(a) and 5(b) when the switch is closed the antenna voltage is clamped to the DC storage capacitor voltage through the low impedance of the rectifier.

FIGS. 6(a) and 6(b) show electrical models for the invention when the modulator switch SW1 is closed. In these circumstances the series impedance of the switch is reduced to a minimum (nominally zero). FIG. 6(a) shows the antenna circuit with the rectifiers and the DC circuit. The residual series impedance between the antenna and the storage capacitor is that of the dynamic impedance of the rectifier. Accordingly, the following holds:

$$R(diode)=d(Vdiode)/d(Idiode) \qquad (7)$$

In this state the DC storage capacitor can be represented by a low impedance voltage source which provides a DC voltage of Vdc. The chip load is represented by R(chip). The average current from the DC storage capacitor must be zero for steady state operation and hence the average current flow in the representative voltage source is zero. FIG. 6(b) shows the equivalent AC circuit model, where the DC storage impedance acts as an AC short circuit and the load impedance seen by the antenna is only the dynamic impedance of the rectifier. Since the AC impedance of the DC storage capacitor is very small it behaves as a short circuit in the AC circuit and as a low impedance voltage source for the DC circuit.

When switch SW1 is open, current pulses from the rectifier and charges the DC capacitor through R(modulator). Accordingly, an instantaneous voltage V(modulator,t) is produced, where:

$$V(modulator,t)=R(modulator)\cdot I(diode,t) \qquad (8)$$

It will be appreciated that I(diode,t) is the instantaneous rectifier current.

The peak antenna voltage is therefore fixed at the sum of the DC capacitor voltage and V(modulator,t) through the rectifier.

FIGS. 7(a) and 7(b) show electrical models for the invention when the modulator switch SW1 is open. In this configuration the series modulator impedance, as seen by the antenna, is increased to a maximum, nominally R(modulator). FIG. 7(a) shows the antenna circuit with rectifiers and the DC circuit. The series impedance between the antenna and the storage capacitor is that of the dynamic impedance of the rectifier R(diode) and the modulation resistance R(modulator), where:

$$R(\text{diode}) = d(V\text{diode})/d(I\text{diode}) \quad (9)$$

The DC storage capacitor can be represented by a low impedance voltage source with the DC voltage Vdc across it and the chip load is represented by R(chip). The average current from the DC storage capacitor must be zero for steady state operation and hence the average current flow in the representative voltage source is zero. FIG. 7(b) shows the equivalent AC circuit model where the load impedance seen by the chip is the sum of the dynamic impedance of the rectifier and the modulation resistance R(modulator). Since the AC impedance of the DC storage capacitor is very small it is modelled as an AC short circuit.

At the operating frequency of the transponder the DC storage capacitor presents a low impedance to effectively decouple the DC rail. In effect, the capacitor presents a short circuit to the AC signals. Positioning R(modulator) between the antenna and the DC storage capacitor means that the antenna "looks" through this small resistance into the capacitor short circuit. Consequently, the effective AC load on the antenna is only the sum of R(modulator) and R(diode). Accordingly, the total Q factor of the antenna (Qt) will be extremely small. In this embodiment typical values are R(diode)=120R, L=5 uH and C=27 pF. This provides a total Q factor Qt=0.28. Hence the transient response of the antenna is no longer limited by its Q factor.

With changes in the series impedance of R(modulator) the steady state operating condition of the circuit can be expected to change with a commensurate change in the DC capacitor voltage. A change in operating DC voltage represent a change in the energy stored in this capacitor. The larger the capacitor value the greater the amount of energy required to change its voltage. In prior art systems the antenna voltage must track the DC voltage and the inertia of the DC storage system severely limits the maximum data rate. The maximum slew rate of the DC voltage, d(Vdc)/dt, is given as follows:

$$d(Vdc)/dt = Cdc/Idc \quad (10)$$
$$= Cdc \cdot R(\text{chip})/Vdc$$

This change will take on the order of tens of microseconds or longer. Once this is appreciated it becomes clear why the prior art arrangements have inherently low data rate limitations. More particularly, to operate effectively the prior art modulation switching rate had to be less than the DC slew rate limit. In contrast, the preferred embodiments of the invention described herein accommodate a modulation switch rate greater than this same limit.

The modulator switch SW1 is operated at a high frequency, spending only a fraction of its time (typically 50%) open and the balance closed. Consequently, the modulator resistor presents an average resistance (typically 50%) of its actual value to the circuit. As switch SW1 opens and closes the DC voltage across the capacitor Cdc remains essentially unchanged because of the decoupling action described above. Over time, however, the circuit will move to a new steady state operating point commensurate with this average resistance value. Accordingly, in these embodiments there is a lower limit on the switch rate which must be faster than the response time of the DC capacitor voltage to the change in series impedance. An example of typical values of components are Cdc=10 nF, R(modulator)=120R, Vdc=3.3V and Idc=1 mA. These provide a slew rate of 10 us which implies a minimum switch rate greater than 100 KHz.

From this steady state condition, closure of the switch will cause the DC storage capacitor to clamp the peak antenna voltage to Vdc. Conversely, opening the switch will increase the peak antenna voltage by V(modulator,t)=R(modulator)·I(diode,t). The peak rectifier current, that is, MAX I(diode,t) is roughly eight to ten times the average DC load current. Therefore, the maximum modulator voltage MAXV(modulator,t) is given by:

$$\text{MAX}V(\text{modulator},t) = 8 \cdot R(\text{modulator}) \cdot Vdc/R(\text{load}) \quad (11)$$

For typical circuit values of Vdc=3.3V, R(load)=3K3R and R(modulator)=120R, then MAXV(modulator)=0.96 V.

The dynamic load seen by the tuned circuit is the series resistance of R(modulator) and the rectifier dynamic impedance (typically R(diode)=1V/8 mA=120R). Therefore R(modulator)+1V/8 mA=240R. The DC storage capacitor is an effective AC short circuit. For typical values of L=5 uH, C=27 pF and R(modulator)+1V/8 mA=240R then Qt=0.55. That is, the antenna's transient response is not be limited by its Q factor. In effect, the peak voltage across the antenna will instantaneously move to the new peak value.

FIGS. 8(a) and 8(b) show embodiments of the invention where the series resistance is modulated by an RF sub-carrier. The RF sub-carrier is amplitude modulated onto the antenna. FIGS. 9(a) and 9(b) show embodiments of the invention where data is modulated onto the sub-carrier. Data imposed on the sub-carrier (as sub-carrier modulation) is then transmitted from the antenna. The preferred method of sub-carrier modulation is PRK because it does not produce any change in the circuit's DC operating point. The sub-carrier frequency can be derived from any source. In the preferred embodiment it is derived by division of the excitation field's frequency. Most preferably, however, The sub-carrier frequency is faster than the maximum slew rate of the DC storage system, where that slew rate in the present embodiment is given by:

$$d(Vdc)/dt = Cdc \cdot R(\text{chip})/Vdc \quad (12)$$

A wide range of sub-carrier frequencies is accommodated by this embodiment. For example, in one form the sub-carrier frequency is as high as 50% of the excitation frequency, while in other forms that sub-carrier frequency is as low as a few percent of the excitation frequency. As will be appreciated, the low frequency limit is effectively imposed by the DC storage capacitor slew rate.

FIGS. 10(a) to 10(g) show various voltage waveforms and spectra that provide further assistance in understanding the operation of the embodiments of the invention illustrated in FIG. 8 and FIG. 9. As shown, with the opening and closing of the modulator switch, the antenna voltage effectively instantaneously follows the switch action. The relationship between the switch closures and the antenna voltage is shown in FIGS. 10(a) and 10(b). The antenna voltage is amplitude modulated by the series impedance modulator at the sub-carrier frequency Fs. The spectrum of the antenna current will consist of the excitation frequency Fc and sidebands at Fc+Fs and Fc−Fs as shown in FIGS. 10(c) and 10(d). The sub-carrier has been frequency translated by amplitude modulation up to the excitation frequency. The sub-carrier may be modulated with data, preferentially PRK because it does not disturb the DC operating point of the circuit. FIGS. 10(e) and 10(g) show the data spectrum modulated onto the sub-carrier which is then amplitude modulated onto the excitation frequency of the antenna.

The modulated sub-carrier sideband currents generate a field which radiates off the antenna. The sub-carrier frequency should be greater than the circuit's DC settling time so as not to disturb the steady state operating point. Preferably also, for the embodiments of FIGS. 5(a) and 5(b), the sub-carrier frequency is less than the excitation frequency. In the preferred embodiment the sub-carrier is generated by dividing down the excitation frequency. A large number of sub-carrier frequencies are available through the judicious choice of divider values. Thus by randomly selecting a divider value from an available set of divider values the transponder can choose a channel to transmit data on and consequently is capable of simultaneously identifying itself amongst a multitude of similar transponders. Such an arrangement is disclosed in Australian patent application no. 00469/88, the disclosure of which is incorporated herein by way of cross reference.

Further to the advantage of being able to generate a high frequency carrier suitable for the transmission of data at high speeds, these sub-carriers are well away from the close to carrier phase noise in the excitation signal. Consequently, compared to the prior art systems, a receiver in accordance with the described embodiments of the invention will be able to detect a much weaker transponder signal because the excitation signal's phase noise does not interfere with the transponder's signal.

FIGS. 11(a) and 11(b) show embodiments of the invention where the antenna is an untuned coil. In FIG. 11(a) a modulated series resistor is placed between the antenna and the storage capacitor in the AC part of the circuit. In FIG. 11(b) a modulated series resistor is placed between the antenna and the storage capacitor in the DC part of the circuit. Although both circuits produce the same transmitted signal the circuit of FIG. 11(b) is simpler to implement because of the DC operating bias. Switch SW1 represents modulation means for varying the impedance of series resistor Rs. For simplicity a switch is shown although in other embodiments alternative methods of achieving a controlled variable impedance are used.

In embodiments where an untuned antenna is used the response rate is limited by the DC storage system only. Notwithstanding, the advantages of the series impedance modulator applied to tuned antennas still applies. The voltage across the modulation resistor V(modulator) is given by:

$$V(\text{modulator}) = R(\text{modulator}) \cdot I(\text{diode}) \tag{13}$$

and is generated by the rectifier current. This voltage adds to the voltage across the DC storage capacitor, and the instantaneous peak coil voltage follows the switch openings and closures. Provided the switch rate is significantly faster than the DC slew rate then there will be no change in the circuits DC operating point and hence no change in the energy stored in the DC storage capacitor.

FIGS. 12(a) to 12(d) show various arrangement for modulating the series resistance. The switch shown in FIG. 12(a) can be implemented by way of a FET or BJT switch as shown in FIG. 12(b). Alternatively, the channel resistance of a FET can be used to create a specific switchable series resistance, and is illustrated in FIG. 12(c). FIG. 12(d) shows an arrangement where the value of the series resistance can be varied between two (or more) values.

The preferred embodiment of the invention will now be described in more general terms using the "Compensation Theorem". The Compensation Theorem is as follows:

If the impedance of a branch carrying a current I is increased by ΔZ then the increment in current and voltage in each branch of the network is the same as would be produced by an opposing voltage ΔV=IΔZ introduced in series with ΔZ in the same branch.

A reference for this is given in "Electrical Engineering Circuits" $2^{nd}$ edition H. H Skilling, page 373.

For an antenna with a rectifier and DC storage means, such as a capacitor, the peak antenna voltage is clamped through the rectifier to the DC storage voltage. In the prior art, changes in the antenna terminal peak voltage causes corresponding changes in the antenna current. This, however, can occur no faster than the rate with which the DC voltage can slew, as has been discussed above.

For modelling purposes the DC storage capacitor is replaced with a voltage source Vdc and the rectifiers with a fixed forward volt drop equal to V(diode). The peak antenna voltage will be clamped at Vdc+V(diode). If the voltage source Vdc experiences a small step change dVdc then the peak antenna voltage will instantly follow, since it is clamped to it through the rectifiers. That is, Vdc→Vdc+dVdc. FIG. 13(a) shows an arrangement where the voltage source dVdc is in series with Vdc.

Alternatively the same behaviour occurs if two separate voltage sources are used. FIG. 13(b) shows such an arrangement where Va=Vdc and Vb=Vdc+dVdc. This is equivalent to causing an instantaneous change to the DC storage voltage in the prior art system. However, this is impossible in practice as it requires an infinite impulse of power.

The invention provides an alternative arrangement for achieving this same result by placing a voltage source in series with Vdc as shown in FIG. 13(a). The effect of the modulator can be understood with reference to the Compensation Theorem. The modulator resistance R(modulator) with parallel switch closed is represented by a short circuit. When the switch opens the Compensation Theorem represents it as R(modulator) in series with a voltage source V(modulator)=I(diode)·R(modulator). The transient response can then be fully described by considering this step voltage change V(modulator) in series with R(modulator) and the rectifier impedance. The DC voltage source Vdc is ignored. Since the antenna is being driven by a step applied voltage source through a low impedance the antenna will be instantly driven to the new peak voltage as per the circuits of FIGS. 13(a) and 13(b). FIG. 14 shows the circuit where the equivalent Compensation Theorem derived source is connected to the antenna.

FIGS. 15(a) and 15(b) show two further embodiments of a transceiver according to the invention where the modulated series resistance is placed in series with the antenna tuning capacitor. In FIG. 15(a) the transceiver includes transponder circuitry which is connected across the antenna coil. In FIG. 15(b) the transponder circuitry is connected across the tuning capacitor. In this manner only the resonant current $I_{ac}$ passes through the modulator. The current for the transponder's rectifier circuit $I_{rect}$ does not pass through the modulator to prevent the generation of high level spurious harmonics.

FIG. 16 illustrates schematically a preferred embodiment of a tuned antenna according to the invention where the modulator is placed between the antenna coil and the tuning capacitor. A coil L is tuned with a capacitor C. A modulated series resistance $R_{(modulator)}$ is placed between the coil and the tuning capacitor. The coil is excited by the interrogator signal having an AC voltage $V_{ac}$ as its resonant frequency. This causes a resonant current $I_{ac}$ to flow between the coil and the tuning capacitor through $R_{(modulator)}$. A voltage $V_{(modulator)}$ appears across $R_{(modulator)}$, where:

$$V_{(modulator)} = I_{ac} \cdot R_{(modulator)} \quad (14)$$

If $R_{(modulator)}$ is modulated to a depth of $\Delta R_{(modulator)}$ then the change in magnitude of $V_{(modulator)}$ is $\Delta V_{(modulator)}$ where:

$$\Delta V_{(modulator)} = I_{ac} \cdot \Delta R_{(modulator)} \quad (15)$$

Switch SW1 in FIG. 16 represents a modulator that varies the impedance of series resistor $R_{(modulator)}$. For simplicity a switch is illustrated, however, and as would be appreciated by those skilled in the art, any means of achieving a controlled variable impedance can be substituted. In this embodiment the switch is modulated with a signal that is either a baseband signal or a carrier frequency with data modulated on to the carrier for transmission. Typically the carrier frequency is chosen in the range from a few hertz to thousands of times the excitation frequency. The preferred method of data modulation onto the carrier is Phase Reverse Keying PRK. The modulator SW1 is switched so that it spends a fraction of its time (typically 50%) open and the balance closed. Consequently, the modulator presents an average resistance (typically 50%) of its value to the circuit at the resonant frequency.

The envelope of the voltage across the antenna follows the openings and closures of the switch. When the switch is closed the antenna voltage is equal to the tuning capacitors instantaneous voltage and when the switch is open the antenna voltage is equal to the tuning capacitors instantaneous voltage plus $V_{(modulator)}$.

FIGS. 17(a) and 17(b) illustrate the electrical model of the invention at the tuned frequency and at a higher radio frequency respectively.

This embodiment of the invention can be described in general terms using the "Compensation Theorem" described above. Using the Compensation Theorem it becomes evident that the modulator resistor can be replaced by an equivalent series voltage source $\Delta V_{(modulator)}$ and $R_{(modulator)}$. Under superposition the voltage source $\Delta V_{(modulator)}$ will cause a current $I_{mod}$ to flow in the tuned circuit. The magnitude of is limited by the series impedance of the coil and capacitor combination and $R_{(modulator)}$. The modulation current $I_{mod}$ in the coil will transmit the modulation as a magnetic field. The strength of the transmitted signal is proportional to the magnetic moment which is given by the product of the coil current $I_{mod}$, the coil area and the number of turns.

The tuned model of FIG. 17(a) shows the coil L, the coil's AC resistance $r_{ac}$ and the tuning capacitor C. The modulation resistance has been replaced by the Compensation Theorem equivalent series combination of $\Delta V_{(modulator)}$ and $R_{(modulator)}$. The magnitude of current $I_{mod}$ flowing in the coil is limited by the series impedance of the coil and capacitor combination, $r_{ac}$ and $R_{(modulator)}$.

In this embodiment $R_{(modulator)}$ is modulated at radio frequencies (RF) and, as such, an RF model of the invention, as shown in FIG. 17(b), is used to analyse the circuit. At radio frequencies the tuning capacitor C is replaced with an RF short circuit and the coil's parallel stray capacitance $C_s$ is added. Unlike the prior art circuits the tuning capacitor now has no effect upon circuit operation. Furthermore, for typical values of $C_s$ the series impedance of $C_s$ is much higher than $R_{(modulator)}$ and, consequently, this has little or no effect upon the magnitude of the current $I_{mod}$ in the coil. $I_{mod}$ is now only limited by the coil impedance, $r_{ac}$ and $R_{(modulator)}$.

For an RF frequency of around 3 MHz some typical circuit values are as follows: $R_{(modulator)}$=10Ω; $\Delta R_{(modulator)}$=5Ω; $I_{ac}$=25 mA; L=250 uH; $r_{ac}$=25Ω; $C_s$=100 pF; and C=5.6 nF. Hence $V_{(modulator)}$=125 mV and $I_{mod}$=26.5 uA. For a coil with 50 turns and an area of 80 mm by 50 mm the magnetic moment will be 5.3 uA.turns.m².

Where a carrier frequency lower than the resonant frequency is used the compensation theorem still holds and the envelope of the coil voltage follows the tuning capacitor voltage plus $V_{(modulator)}$. Consequently, the current through the coil is modulated by $R_{(modulator)}$ regardless of the carrier frequency.

FIGS. 18(a), 18(b), 18(c) and 18(d) show various exemplary waveforms of the invention. FIG. 18(a) shows the coil resonant current $I_{ac}$. FIG. 18(b) shows the magnitude of $R_{(modulator)}$ when modulated with a carrier frequency higher than the resonant frequency. The nominal change in $R_{(modulator)}$ is between 0 and $R_{(modulator)}$. FIG. 18(c) shows the magnitude of the voltage across the modulation resistance. The phase of the carrier frequency is varied 180 degrees at the zero crossing of $I_{ac}$ to compensate for the sign change in $I_{ac}$ and, consequently, there is no phase change in the current $I_{mod}$. The envelope of $I_{mod}$ is modulated by $I_{ac}$ and resembles a full wave rectified sine wave. FIG. 18(d) shows the magnitude of the voltage across the modulation resistance where the resistance has been scaled to compensate for the variation in the magnitude of $I_{ac}$. The magnitude of $R_{(modulator)}$ may be varied in discrete steps or continuously over each half cycle of $I_{ac}$ to effectively waveshape $I_{mod}$. If the carrier frequency is lower than the resonant frequency then waveshaping to compensate for the envelope of $I_{ac}$ is not necessary.

FIGS. 19(a), 19(b), 19(c), and 19(d) show typical frequency spectra associated with FIGS. 18(a) to 18(d). More particularly, FIG. 19(a) illustrates the spectrum of a full wave rectified version of the sine wave current $I_{ac}$. The full wave rectified signal has a DC component and substantial even harmonics in its spectrum. FIG. 19(b) illustrates the spectrum of the higher frequency carrier that has already been modulated with data. FIG. 19(c) illustrates the spectrum of the resulting voltage across $R_{(modulator)}$. The data spectrum has been modulated on to the spectral lines of the full wave rectified spectrum of $I_{ac}$ and translated in frequency up to the carrier frequency. When waveshaped, the extra harmonic sidebands are suppressed as shown in FIG. 19(d). Simple four step shaping Of $R_{(modulator)}$ will suppress all the sidebands to less than −20 dBc.

FIGS. 20(a) to 20(d) show various modulators for varying the impedance $R_{(modulator)}$. The simple switch shown in FIG. 20(a) is, in different embodiments, implemented differently, as required. By way of example, the switch, in some embodiments, takes the form of a FET or BJT switch as schematically illustrated in FIG. 20(b). Alternatively, FIG. 20(c) illustrates how the channel resistance of a FET is used to create a specific switchable series resistance. FIG. 20(d) shows an arrangement where the value of the series resistance is varied between several values to allow waveshaping of the amplitude of $V_{(modulator)}$.

FIG. 21 illustrates in more detail the circuitry for another embodiment of a transceiver according to the invention. In this embodiment the transponder circuitry is connected across the capacitor to minimise the spurious harmonic levels. A comparator is connected across a sense resistor to sense the zero crossing of $I_{ac}$. The phase of the carrier is reversed on the zero crossings by XOR1. The carrier is generated in the carrier generator. If a high frequency carrier is required then a PLL multiplier is used to multiply up the resonant frequency. Alternatively, if a lower frequency carrier is required then a divider circuit can be used to divide down the resonant frequency. Processor circuitry generates the transponder data message which is used to PRK modulate the carrier frequency in XOR2. If required, waveshaping of the transmitted current is done by a multi-level modulator as shown in FIG. 20(d).

FIGS. 22 to 25 illustrate an embodiment of the invention applied to a baggage handling system. The transponder is encased with a two part foldable label which is mounted to a piece of baggage. As shown, a convenient mounting point for the label is the carry handle of the baggage.

One piece of the label includes the transponder which is in the form of a board mounted circuit. That is, the required components are mounted to a circuit board and interconnected to allow operation. Accordingly, the transponder is easily retained on the baggage, and also easily removed, as required. When a piece of baggage passes a check point it is also passed through an interrogating signal which, in turn, causes the generation by the transponder of a response signal. This signal is received by the checking station and allows subsequent automatic redirection of the baggage to one of a plurality of predetermined holding areas.

As described above, the preferred embodiments of the invention offer may advantages over known systems. Of particular advantage, however, is the removal of the inertia of the storage means and, as such, a removal of the imposition of high speed data onto the antenna.

Although the invention has been described with reference to specific examples it will be appreciated by those skilled in the art that it may be embodied in many other forms.

The invention claimed is:

1. A transceiver including:
a single antenna adapted for simultaneously receiving a first signal and transmitting a second signal;
a signal processor for receiving from the antenna a third signal indicative of the first signal; and
a modulator disposed between the antenna and the signal processor for providing a fourth signal to the antenna for forming the second signal, the modulator varying the impedance between the antenna and the signal processor for providing the antenna with a simultaneous dual Q-factor, the Q-factor being high for the first signal and low for the second signal.

2. A transceiver including:
a single antenna adapted for simultaneously receiving a first radio frequency (RF) electromagnetic signal and transmitting a second RF electromagnetic signal;
a signal processor for receiving from the antenna a third electrical signal based on the first RF electromagnetic signal;
a modulator disposed in series between the antenna and the signal processor for providing a fourth electrical signal to the antenna to produce the second RF electromagnetic signal, the modulator varying the series impedance between the antenna and the signal processor; and
wherein the modulator varies the impedance between the antenna and the signal processor, such that the antenna simultaneously has a high Q factor for signals received by the antenna and a low Q factor for signals transmitted from the antenna.

3. A transceiver according to claim 2 wherein the transceiver is a transponder and the first and second signals are modulated at a first frequency and a second frequency respectively, the first and second frequencies being different to each other.

4. A transceiver according to claim 3 wherein the transponder is passive and the signal processor includes processing circuitry and power storage means, wherein some of the power provided by the third signal is stored in the power storage means for subsequently powering the transponder.

5. A transceiver according to claim 4 wherein the impedance is varied between the high and the low value at a rate greater than the DC slew rate for the third signal.

6. A transceiver according to claim 5 wherein the impedance is a resistance.

7. A transceiver according to claim 2 wherein the antenna is a coil which is tuned by a capacitor.

8. A transceiver according to claim 2 wherein the voltage across the antenna is modulated or varied in a predetermined manner to generate the second signal.

9. A transceiver according to claim 8 wherein the modulation or variation in antenna voltage corresponds to a proportional variation in the antenna current.

10. A transceiver according to claim 9 wherein the modulator means varies a low impedance which is disposed in series between the antenna and the signal processor to cause a variation in the voltage across the antenna.

11. A transceiver according to claim 10 wherein the low impedance is less than 10% of the total load impedance seen by the antenna.

12. A transceiver according to claim 10 wherein the impedance is modulated with an RF sub-carrier and data is modulated onto the sub-carrier for transmission.

13. A method for operating a transceiver including the steps of:
providing a single antenna adapted for simultaneously receiving a first radio frequency (RF) electromagnetic signal and transmitting a second RF electromagnetic signal;
providing a signal processor for receiving from the antenna a third electrical signal based on the first RF electromagnetic signal;
providing an impedance for modulation, via a modulator, the modulator being disposed in series between the antenna and the signal processor;
providing a fourth electrical signal to the antenna to produce the second RF electromagnetic signal;
varying the impedance between the antenna and the signal processor; and
wherein the step of varying provides the antenna with a simultaneous dual Q-factor, the Q-factor being high for the first RF electromagnetic signal and low for the second RF electromagnetic signal.

14. A passive transponder including:
a single antenna adapted for simultaneously receiving and transmitting a first radio frequency (RF) electromagnetic signal and a second RF electromagnetic signal respectively;
a signal processor for:
receiving a third electrical signal from the antenna which is derived from the first RF electromagnetic signal; and
providing a fourth electrical signal derived from the third electrical signal;
a power storage means in parallel with the signal processor for absorbing some of the power of the third electrical signal, the absorbed power being subsequently used by the transponder;

a modulator disposed in series between the antenna and the power storage means for selectively varying the impedance therebetween to generate the second RF electromagnetic signal and provide the antenna with a simultaneous dual Q-factor, the Q-factor being high for the first RF electromagnetic signal and low for the second RF electromagnetic signal; and a mixer for producing a fifth signal by combining the fourth electrical signal with a sub-carrier, the fifth signal being provided to the modulator.

15. A transponder according to claim 14 wherein the modulator varies the impedance in accordance with the fifth signal.

16. A transponder according to claim 15 wherein the impedance is a resistance.

17. A transponder according to claim 14 wherein the power storage means includes a capacitor.

18. An antenna adapted for simultaneously receiving and transmitting a first radiofrequency (RF) electromagnetic signal and a second RF electromagnetic signal respectively, the antenna including:

a tuned coil in which the first signal generates a first current and which supports a second current for generating said second signal; and a modulator disposed in series with the coil, said first and second currents flowing through said modulator for providing said coil with a simultaneous dual Q factor, the Q factor being high for the first current and low for the second current.

19. An antenna according to claim 18 wherein the first current or a signal derived from the first current is provided to a signal processor whereby the modulator varies the impedance between the coil and the signal processor.

20. An antenna according to claim 19 wherein the impedance is a resistance which is switched between a predetermined value and negligible resistance.

21. A transceiver including:

a single antenna adapted for simultaneously receiving a first radio frequency (RF) electromagnetic signal and transmitting a second RF electromagnetic signal;

a signal processor for receiving from the antenna a third electrical signal indicative of the first signal; and a modulator disposed in series between the antenna and the signal processor for providing a fourth electrical signal to the antenna to produce the second signal, the modulator varying the voltage across the antenna in a substantially stepwise manner to effect a variation in the current flowing through the antenna between a low and a high value for allowing transmission of the second signal without substantially affecting the receiving efficiency of the antenna, wherein the modulator is adapted to further provide the antenna with a simultaneous dual Q-factor, the Q-factor being high for the first RF electromagnetic signal and low for the second RF electromagnetic signal.

22. A transceiver according to claim 21 wherein the first signal includes a carrier signal and the variation of the current between the low and the high value occurs within less than or about one period of the carrier signal.

23. A method for operating a transceiver including the steps of:

providing an antenna adapted for simultaneously receiving a first radio frequency (RF) electromagnetic signal and transmitting a second RF electromagnetic signal;

providing a signal processor for receiving from the antenna a third electrical signal based on the first signal;

providing a modulator disposed in series between the antenna and the signal processor;

providing a fourth electrical signal to the antenna to produce the second signal;

varying the impedance of the modulator, thereby to vary the voltage across the antenna in a substantially stepwise manner to effect a variation in the current flowing through the antenna between a low and a high value for allowing transmission of the second signal without substantially effecting the receiving efficiency of the antenna; and wherein the step of varying provides the antenna with a simultaneous dual Q-factor, the Q-factor being high for the first RF electromagnetic signal and low for the second electrical signal.

24. A transceiver including:

a single antenna adapted for simultaneously receiving a first radio frequency (RF) electromagnetic signal having a first predetermined frequency and, in response thereto, generating a second electrical signal;

receiving circuitry being responsive to the second signal;

tuning circuitry for providing the antenna with a resonant frequency at or about the first predetermined frequency; and a modulator disposed in series between the antenna and the tuning circuitry for varying the impedance therebetween such that the second signal generates a third electrical signal in the antenna at a second predetermined frequency and the antenna transmits a fourth RF electromagnetic signal derived from the third signal; and wherein the modulator is adapted to provide the antenna with a simultaneous dual Q-factor, the Q-factor being high for the first RF electromagnetic signal and low for the second RF electromagnetic signal.

25. A transceiver according to claim 24 wherein the first and second predetermined frequencies are substantially different.

26. A transceiver according to claim 24 wherein the antenna includes a coil and the tuning circuit includes a capacitor connected in parallel with the coil.

27. A transceiver according to claim 26 wherein the antenna consists of a coil and the tuning circuit consists of a capacitor.

28. A transceiver according to claim 24 wherein the modulator is connected in series with the capacitor.

29. A transceiver according to claim 24 wherein the receiving circuitry, in response to the second signal, actuates the modulator to provide the third signal.

30. A transceiver according to claim 29 wherein the third signal is modulated in accordance with a data signal specific to that transceiver.

31. A transceiver according to claim 30 wherein the data signal is stored in the receiving circuitry and selectively provided to the modulator.

32. A transceiver according to claim 31 wherein the second signal is the current generated in the antenna by the first signal.

33. A transceiver according to claim 31 wherein the second signal is the voltage induced across the tuning circuitry by the first signal.

34. A transceiver including:

a single antenna adapted for simultaneously receiving a first signal and transmitting a second signal, the antenna being a tuned coil in which the first signal generates a first current and which supports a second current for generating the second signal;

a signal processor for receiving from the antenna a third signal indicative of the first signal; and a modulator disposed between the antenna and the signal processor for providing a fourth signal to the antenna for forming the second signal, the modulator varying the impedance between the antenna and the signal processor for providing the antenna with a simultaneous dual Q-factor, the Q-factor being high for the first signal and low for the second signal.

35. A transponder including:

a single antenna adapted for simultaneously receiving a first signal and transmitting a second signal, the first and second signals are modulated at a first frequency and a second frequency, respectively, the first and second frequencies being different to each other;

a signal processor for receiving from the antenna a third signal indicative of the first signal; and a modulator disposed between the antenna and the signal processor for providing a fourth signal to the antenna for forming the second signal, the modulator varying the impedance between the antenna and the signal processor for providing the antenna with a simultaneous dual Q-factor, the Q-factor being high for the first signal and low for the second signal.

* * * * *

UNITED STATES PATENT AND TRADEMARK OFFICE
CERTIFICATE OF CORRECTION

PATENT NO. : 7,546,092 B1
APPLICATION NO. : 09/601122
DATED : June 9, 2009
INVENTOR(S) : Graham Murdoch It is certified that error appears in the above-identified patent and that said Letters Patent is hereby corrected as shown below:

In References Cited:
Insert Non Patent Literature Document --SKILLING, H.H., "Electrical Engineering Circuits", $2^{nd}$ edition, pages 373-375--

In Column 7, Line 9
Replace "$WL/r_{ac}$" with --$wL/r_{ac}$--

In Column 12, Line 11
Replace "AZ" with --$\Delta Z$--

In Column 13, Line 47
Insert --$I_{mod}$-- after *of*

Signed and Sealed this

Third Day of November, 2009

David J. Kappos
*Director of the United States Patent and Trademark Office*